(12) United States Patent
Ganesan et al.

(10) Patent No.: US 12,217,152 B1
(45) Date of Patent: Feb. 4, 2025

(54) SYSTEMS AND METHODS FOR USING DEEP MACHINE LEARNING FOR EVOLVING BOUNDARY CONDITION PROBLEMS

(71) Applicant: Wells Fargo Bank, N.A., San Francisco, CA (US)

(72) Inventors: Narayan Ganesan, San Francisco, CA (US); Yajie Yu, San Francisco, CA (US); Bernhard Hientzsch, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1040 days.

(21) Appl. No.: 17/248,657

(22) Filed: Feb. 2, 2021

(51) Int. Cl.
*G06N 3/047* (2023.01)
*G06F 16/901* (2019.01)
*G06N 3/08* (2023.01)

(52) U.S. Cl.
CPC ......... *G06N 3/047* (2023.01); *G06F 16/9024* (2019.01); *G06N 3/08* (2013.01)

(58) Field of Classification Search
CPC ....... G06N 3/047; G06N 3/08; G06F 16/9024
See application file for complete search history.

(56) References Cited

PUBLICATIONS

McFall, K. S. (May 2006). An artificial neural network method for solving boundary value problems with arbitrary irregular boundaries. Georgia Institute of Technology. (Year: 2006).*
Arun, A., Shyamkumar, N., & Wu, C. H. L. (Dec. 2020). Learning Solutions to Partial Differential Equations. (Year: 2020).*
Guo, Y., Cao, X., Liu, B., & Gao, M. (Aug. 2020). Solving partial differential equations using deep learning and physical constraints. Applied Sciences, 10(17), 5917. (Year: 2020).*
Rackauckas, C., Ma, Y., Martensen, J., Warner, C., Zubov, K., Supekar, R., . . . & Edelman, A. (Aug. 2020). Universal differential equations for scientific machine learning. arXiv preprint arXiv:2001.04385. (Year: 2020).*

(Continued)

*Primary Examiner* — Michael J Huntley
*Assistant Examiner* — Maggie Thanh Maido
(74) *Attorney, Agent, or Firm* — K&L Gates LLP

(57) ABSTRACT

Systems, apparatuses, methods, and computer program products are disclosed for determining and providing value information and/or boundary activation information for a system defined in an at least partially bounded domain (i.e., the boundary of said domain consisting of at least one point) and having boundary conditions imposed at a boundary thereof. A deep BSDE solver is trained by, for each time step and for each path, determining, based on a set of underlying features for that path, whether a boundary condition has been activated for the path. When it is determined that a boundary condition has been activated for a first time for the path, an output value for the path is updated based on the boundary condition, an output time is updated based on the boundary activation time step, and not updated further. When the boundary condition was not activated for the path by the final time, the output value for the path is a final corresponding value.

20 Claims, 8 Drawing Sheets

(56) References Cited

PUBLICATIONS

Berner, J., Dablander, M., & Grohs, P. (Dec. 2020). Numerically solving parametric families of high-dimensional Kolmogorov partial differential equations via deep learning. Advances in neural information processing systems, 33, 16615-16627. (Year: 2020).*

Bernhard Hientzsch Introduction to solving quant finance problems with time-stepped FBSDE and deep learning. arXiv preprint arXiv:1911.12231, Nov. 2019.

Bing Yu et al., "Deep-learning based numerical BSDE method for Barrier options" arXiv preprint arXiv:1904.05921, (2019).

Fabio Mercurio, Bergman, Piterbarg, and beyond: "Pricing derivatives under collateralization and differential rates", In Actuarial Sciences and Quantitative Finance, pp. 65-95. Springer, (2015).

Ganesan, Narayan et al., "Pricing Barrier Options with DeepBSDEs", Corporate Model Risk, Wells Fargo, dated May 22, 2020.

Jiequn Han et al. "Solving high-dimensional partial differential equations using deep learning", Proceedings of the National Academy of Sciences, 115(34):8505-8510, (Aug. 21, 2018).

Maziar, Raissi "Forward-backward stochastic neural networks: Deep learning of high-dimensional partial differential equations" arXiv preprint arXiv:1804.07010, (Apr. 19, 2018).

Nicolas Perkowski, "Backward Stochastic Differential Equations: an Introduction", (2010).

Nicole El Karoui et al. "Backward stochastic differential equations in finance", Mathematical finance, 7(1):1-71, 1997.

Quentin Chan-Wai-Nam et al. "Machine learning for semi linear PDEs", Journal of Scientific Computing, 79(3):1667-1712, 2019. arXiv:1809.07609.

Come Huré, et al., "Some machine learning schemes for high-dimensional nonlinear PDEs" dated Feb. 5, 2019.

Haojie Wang et al., "Deep learning-based BSDE solver for LIBOR market model with application to bermudan swaption pricing and hedging", Jul. 10, 2018.

Jian Liang et al., "Deep learning-based least square forward-backward stochastic differential equation solver for high-dimensional derivative pricing" Jul. 23, 2019.

Peter A Forsyth et al., "Numerical methods for controlled hamilton-jacobi-bellman PDES in finance" Journal of Computational Finance, 11(2):1-44, 2007.

Weinan E et al., "Deep learning-based numerical methods for high-dimensional parabolic partial differential equations and backward stochastic differential equations", Communications in Mathematics and Statistics, 5(4):349-380, dated Jun. 16, 2017.

Xavier Warin, "Nesting monte carlo for high-dimensional non linear PDEs", dated 2018.

* cited by examiner 700
20
VALUE AND/OR BOUNDARY ACTIVATION INFORMATION REQUEST FORM Origination Date:
Maturity Date:
Initial Value:                    ← 702
Terms:
Boundary Condition Type:    ▼
Barrier Value:
Boundary Condition Return Value:

704
SUBMIT

FIG. 7

SYSTEMS AND METHODS FOR USING DEEP MACHINE LEARNING FOR EVOLVING BOUNDARY CONDITION PROBLEMS

TECHNOLOGICAL FIELD

Example embodiments of the present disclosure relate generally to the use of deep machine learning in determining solutions to boundary condition problems and, more particularly, to systems and methods for providing solutions to boundary condition problems in real time or near real time.

BACKGROUND

A wide variety of boundary condition problems exist, such as determining the electric field within an electrostatic region, computation of radio wave attenuation in the atmosphere, solving the Einstein field equations in the vicinity of a black hole, determining the temperature profile of a rod connecting two elements at set temperatures, pricing financial instruments with boundary behaviors (i.e., instruments that change upon crossing certain boundaries such as convert to immediate rebate, change final payoff, etc.), etc. Thus, there are a variety of situations in the natural sciences, engineering, and other fields where models corresponding to bounded domains with boundary conditions are imposed at the boundary are considered.

Traditional methods for computations for boundary condition problems include partial differential equation (PDE) methods, which require significant memory and computational resources and are only capable of handling low dimensional problems, and Monte Carlo methods, which are computationally expensive, may fail to accurately model rare events, and cannot effectively solve non-linear problems or problems with a large number of dimensions.

BRIEF SUMMARY

In various instances, it may be desirable to solve a boundary condition problem and/or determine how likely and/or under what conditions a boundary condition may be activated in a system described within a bounded domain. A wide variety of boundary condition problems exist in various fields such as the natural sciences, engineering, etc. Some non-limiting examples of boundary condition problems include determining the electric field within an electrostatic region, computation of radio wave attenuation in the atmosphere, solving the Einstein field equations in the vicinity of a black hole, determining the temperature profile of a rod connecting two elements at set temperatures, and pricing financial instruments with boundary behaviors. Conventional methods fail to provide techniques that are computationally efficient enough so that multidimensional cases are tractable. For example, multidimensional situations might occur when dealing with multidimensional physical systems, when a portfolio depends on several underlying stocks or other financial underliers, and/or the like. Various embodiments address this technical problem by providing a computationally efficient technique for determining expressions for functions or path wise values for paths within a bounded domain having boundary conditions imposed at the boundary and/or determining how likely, when, and/or under what conditions a boundary condition may be activated in a system described within a bounded domain. In various embodiments, the system and/or the boundary conditions may evolve with time, be dependent on initial conditions of the system, and/or the like. In various embodiments, the system may be a linear system or a non-linear system. The boundary condition may be provided as a constraint that the value of the system must satisfy at certain points in time or at certain values taken by the underlying features.

Various embodiments provide methods, systems, apparatuses, and/or computer program products for the efficient determination of path wise values at one or more points in time for system within a bounded domain having boundary conditions imposed at the boundary. Various embodiments provide methods, systems, apparatuses, and/or computer program products for the efficient determination of how likely and/or under what conditions a boundary condition may be activated in a system within a bounded domain having boundary conditions imposed at the boundary. Various embodiments, provide methods, systems, apparatuses, and/or computer program products for the efficient determination of a function that may be evaluated based on a set of initial conditions to determine a path wise value for the system at a later point in time and/or to determine if a boundary condition of the system will be activated within a particular period of time. Various embodiments are configured to determine and provide information regarding a system within a bounded domain and having boundary conditions imposed at the boundary of the domain in real time or near real time with respect to receiving a corresponding request. Various embodiments provide an interactive user interface (IUI) through which a user may cause a request for a system within a bounded domain and having boundary conditions imposed at the boundary to be analysed such that information regarding the system may be determined and through which a user may be provided the determined information regarding the system.

In various embodiments, the boundary condition problem is posed as a backward stochastic differential equation (BSDE). In various embodiments, a deep BSDE solver is provided that uses a plurality of deep neural networks (DNN) or a DNN comprising a plurality of sub-networks to determine path wise values or functions and/or how likely and/or under what conditions a boundary condition may be activated for a system within a bounded domain and having boundary conditions imposed at the boundary. In various embodiments, the plurality of DNNs and/or the DNN comprising a plurality of sub-networks are trained as parts of a larger computational graph that computes a loss function. In various embodiments, the deep BSDE solver, through deep learning, is trained to determine path wise values and/or functions that may be evaluated based on a set of initial conditions to determine a path wise value. In various embodiments, the deep BSDE solver, through deep learning, is trained to determine how likely a boundary condition of the system is to be activated. In various embodiments, the deep BSDE solver, through deep learning is trained to determine under which conditions (e.g., initial conditions, system evolution conditions, and/or the like) and/or at what point in time in the evolution of the system the boundary conditions are activated. In various embodiments, each of the DNNs or each of the sub-networks correspond to one time in a set of times. Each of the DNNs or each of the sub-networks are trained simultaneously such that complete information regarding the system within the bounded domain is determined through one training of the deep BSDE solver.

In various embodiments, a training iteration of the deep BSDE solver comprises projecting a set of one or more underlying features are projected forward in time along a path through the domain. A value corresponding to the set of one or more underlying features is also projected forward in time, with each DNN or sub-network of the DNN configured to learn a transformation of information regarding the one or more underlying features into the value corresponding to the set of the one or more underlying features. At each time step, it may be determined whether a boundary condition has been activated. In various embodiments, the deep BSDE solver comprises and/or is embodied via a computational graph that computes a loss function. In various embodiments, the computational graph comprises nodes dedicated to evaluating, at each time step, whether a boundary condition has been activated and, when a boundary condition is activated, holding information regarding that boundary condition activation. For example, the computational graph may comprise nodes dedicated to holding information regarding at what time a boundary condition was first activated.

The deep BSDE solver may evaluate a loss function based on the results of the projecting the set of one or more underlying features and/or projecting multiple sets of one or more underlying features forward in time along multiple paths. The loss function may consider that statistical spread of the final values of the path wise values or difference between a learned value for the final value of the path wise values and the determined set of final values for the path wise values. The weights and/or parameters of the deep BSDE solver (e.g., weights and/or parameters of the DNNs and/or sub-networks of the DNN) are modified to decrease the loss function on the next training iteration of the projection of the one or more sets of one or more underlying features for the plurality of paths. Once the deep BSDE solver satisfies a convergence requirement (e.g., the loss function is sufficiently small and/or the number of training iterations has reached a particular number) the resulting values of the path wise values and/or functions describing the path wise values as a function of a set of underlying features, at the various points in time are provided (e.g., for display to a user via a user computing device, stored in memory for later use, provided as input to a computer application, and/or the like). In various embodiments, the DNN (e.g., the sub-networks and/or individual DNNs) of the deep BSDE solver comprises a feedforward DNN. For example, the information within the deep BSDE solver moves from the input nodes, through the hidden nodes, and out to the output nodes without forming any cycles or loops within the network.

According to an aspect of the present disclosure, a method for determining and providing value information and/or boundary activation information for a system defined in a bounded domain and having boundary conditions imposed at a boundary of the bounded domain is provided. In an example embodiment, the method comprises determining, by one or more processors, a plurality of paths for the system through at least a portion of the bounded domain based on an initial set of underlying features and a path evolution determined for each path. Each path corresponds to a set of times comprising an initial time, a final time, and one or more intermediate times between the initial time and the final time. The method further comprises causing, by one or more processors, a deep backward stochastic differential equation (deep BSDE) solver to be trained until a convergence requirement is satisfied by, for each time step and for each path, determining the set of underlying features and a value corresponding to the set of underlying features, determining, based on at least one of (a) the set of underlying features or (b) the value corresponding to the set of underlying features for that path, whether a boundary condition has been activated for the path, and when it is determined that a boundary condition has been activated for a first time for the path, updating an output value for the path based on the boundary condition and an output time based on the time step at which the boundary condition was activated for the path. When the boundary condition was not activated for the path prior to the path reaching the final time, updating the output value for the path based on a final value corresponding to the set of underlying features at the final time. Training the deep BSDE solver further comprises defining a set of output values comprising the output value for each path and determining one or more statistical measures of spread based on the set of output values, and modifying one or more parameters of a DNN of the deep BSDE solver based on the one or more statistical measures of spread. After the convergence requirement is satisfied, the method further comprises determining, by the one or more processors, at least one of (a) final time value information comprising a value corresponding to the system at the final time based on the output value for each path (to assess the mismatch between the value from the determined strategy and the targeted final or boundary value, for example), (b) value information from trained parameters or networks, as the case might be, for the initial time or intermediate time value associated with the problem based on the determined strategy, and/or (c) boundary activation information comprising a likelihood of boundary activation. The method further comprises causing, by the one or more processors, at least a portion of (a) final time value information, (b) value information from trained parameters or networks, and/or (c) boundary activation information to be provided such that a user computing device receives at least a portion of the (a) final time value information, (b) value information from trained parameters or networks for the initial time and/or intermediate time and/or (c) boundary activation information and provides a representation of the at least a portion of the (a) final time value information, (b) value information from trained parameters or networks for the initial time and/or intermediate time, and/or (c) boundary activation information via an interactive user interface provided via a display of the user computing device.

According to another aspect of the present disclosure, an apparatus for determining and providing value information and/or boundary activation information for a system defined in a bounded domain and having boundary conditions imposed at a boundary of the bounded domain. The apparatus comprises processor circuitry. The processor circuitry is configured to determine a plurality of paths for the system through at least a portion of the bounded domain based on an initial set of underlying features and a path evolution determined for each path. Each path corresponds to a set of times comprising an initial time, a final time, and one or more intermediate times between the initial time and the final time. The processor circuitry is configured to cause a deep BSDE solver to be trained until a convergence requirement is satisfied by, for each time step and for each path, determine the set of underlying features and a value corresponding to the set of underlying features, determine, based on at least one of (a) the set of underlying features or (b) the value corresponding to the set of underlying features for that path, whether a boundary condition has been activated for the path, and when it is determined that a boundary condition has been activated for a first time for the path, update an output value for the path based on the boundary condition and an output time based on the time step at which the boundary condition was activated for the path. The processor circuitry is further configured to train the deep BSDE solver by, when the boundary condition was not activated for the path prior to the path reaching the final time, updating the output value for the path based on a final value corresponding to the set of underlying features at the final time; define a set of output values comprising the output value for each path and determining one or more statistical measures of spread based on the set of output values; and modify one or more parameters of a DNN of the deep BSDE solver based on the one or more statistical measures of spread. The processor circuitry is further configured to, after the convergence requirement is satisfied, determine at least one of (a) final time value information comprising a value corresponding to the system at the final time based on the output value for each path (to assess the mismatch between the value from the determined strategy and the targeted final or boundary value, for example), (b) value information from trained parameters or networks, as the case might be, for the initial time or intermediate time value associated with the problem based on the determined strategy, and/or (c) boundary activation information comprising a likelihood of boundary activation; and causes at least a portion of (a) final time value information, (b) value information from trained parameters or networks, and/or (c) boundary activation information to be provided such that a user computing device receives at least a portion of the (a) final time value information, (b) value information from trained parameters or networks for the initial time and/or intermediate time and/or (c) boundary activation information and provides a representation of the at least a portion of the (a) final time value information, (b) value information from trained parameters or networks for the initial time and/or intermediate time, and/or (c) boundary activation information via an interactive user interface provided via a display of the user computing device.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

FIG. 7 illustrates an example IUI that may be used to cause the generation of a request for information regarding a system defined within a bounded domain and having boundary conditions imposed at the boundary, in accordance with an example embodiment described herein.

DETAILED DESCRIPTION

Figure 1:
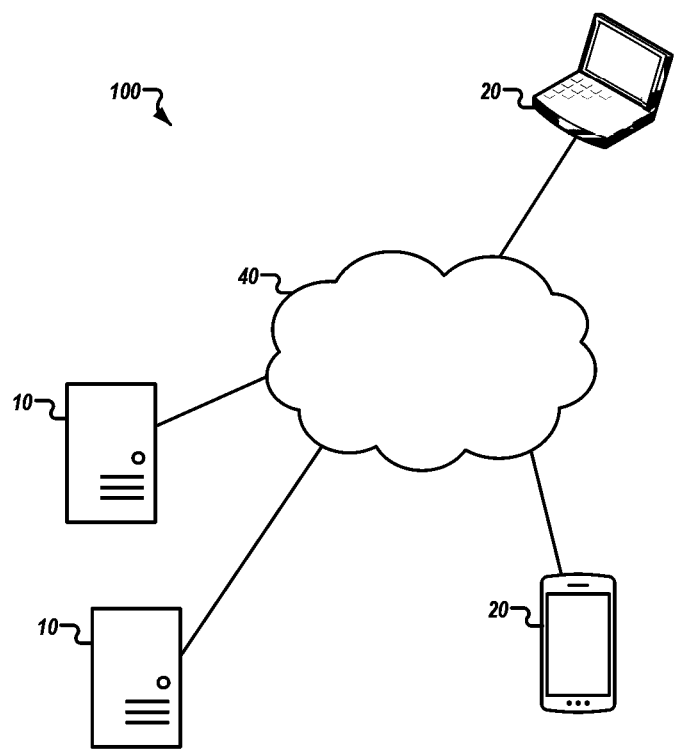
FIG. 1 is a block diagram showing an example architecture of one embodiment described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Where the specification states that a particular component or feature "may," "can," "could," "should," "would," "preferably," "possibly," "typically," "optionally," "for example," "often," "exemplary," or "might" (or other such language) be included or have a characteristic, that particular component or feature is not required to be included or to have the characteristic. Such terminology is intended to convey that the particular component or feature is included in some embodiments while excluded in others, or has the characteristic in some embodiments while lacking the characteristic in others.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessary to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) an application hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Overview

Various embodiments provide methods, systems, apparatuses, and/or computer program products for the efficient determination of solutions for path wise values and/or boundary activation information for a system defined within a bounded domain and having boundary conditions imposed at the boundary. For example, various embodiments correspond to evolving one or more sets of underlying features in time and determining a value corresponding to the one or more sets of underlying features at one or more points in time. As the one or more sets of underlying features and the corresponding values are evolved forward in time (e.g., along a corresponding path), at each time step it is determined whether a boundary condition of the system has been activated. When the boundary condition is activated for a path, information regarding the activation of the boundary condition (e.g., the time at which the boundary condition was activated) is held by the deep BSDE solver. Various embodiments may relate to a variety of boundary condition problems. Some example embodiments will be described herein as relating to the boundary condition problem of pricing a financial instrument with boundary behaviors. For example, the set of one or more underlying features may be a set of items and/or assets and the value corresponding to the set of one or more underlying features may be a financial value, in an example embodiment.

For example, various embodiments provide methods, systems, apparatuses, and/or computer program products for the efficient determination of a value corresponding to a set of one or more underlying features and/or evolution thereof within a bounded domain having boundary conditions imposed at the boundary and/or of information regarding if and/or when a boundary condition of the bounded domain is activated during the evolution of the set of one or more underlying features. Various embodiments may determine value information such as an initial value and/or boundary activation information for a particular set of underlying features and/or as a function of the set of underlying features. Various embodiments may determine boundary activation information such as how likely a boundary condition is to be activated, the time at which the boundary condition is first activated, and/or the like. Various embodiments may correspond to systems having boundary conditions that are static and/or non-evolving, that evolve with time, and/or the like. Various embodiments are configured to determine and provide the value of a portfolio having differential rates at one or more points in time in real time or near real time with respect to receiving a corresponding request.

Various embodiments provide an interactive user interface (IUI) through which a user may cause a request for value and/or boundary activation information determination to be generated and provided and through which a user may be provided with value and/or boundary activation information.

In various embodiments, the value and/or boundary activation information is determined using a deep BSDE solver. In various embodiments, a deep BSDE solver is a computational graph configured to solve a problem posed as a backward stochastic differential equation (BSDE) problem and that includes a plurality of deep neural networks (DNNs) or a DNN that comprises a plurality of sub-networks. In various embodiments, the deep BSDE solver evaluates a loss function and is configured to decrease the value of the loss function with each training iteration of the deep BSDE solver via deep learning of the plurality of DNNs or the DNN comprising the plurality of sub-networks. For example, one or more sets of underlying features may be defined and a plurality of paths describing various evolutions of the set(s) of underlying features may be determined. The deep BSDE solver may use these paths to learn, as a function of the set of underlying features, a value corresponding to the set of underlying features at various points in time (e.g., at an initial or intermediate time). In various embodiments, the DNN of the deep BSDE solver comprises a plurality of sub-networks or individual DNNs, with each sub-network or individual DNN corresponding to a time from a time array (e.g., one of the times for which the path wise values are to be determined). Each of the sub-networks or individual DNNs are trained simultaneously such that the path wise values (e.g., value corresponding to the set of underlying features) at various points in time are determined through one training instance of the deep BSDE solver. In various embodiments, the deep BSDE solver comprises nodes dedicated to determining, at each time of the time array and for each path, whether a boundary condition has been activated and, when a boundary condition is activated, impose the boundary condition and hold the time at which the boundary condition was first activated for the corresponding path.

In various embodiments, one training instance of the deep BSDE solver comprises a plurality of training iterations. In various embodiments, a training iteration of the deep BSDE solver comprises determining an initial (or intermediate) value corresponding to a set of underlying features and/or a function describing an initial (or intermediate) value corresponding to a set of underlying features as a function of the set of underlying features at an initial (or intermediate) time in a time array. In various embodiments, the deep BSDE solver determines the initial value of the function describing the initial value by projecting one or more sets of underlying features forward in time along a plurality of paths (e.g., Monte Carlo paths). As the one or more sets of underlying features are projected forward in time along the plurality of paths, it is determined, at each time step, whether a boundary condition has been activated. A statistical measure of spread (e.g., variance, standard deviation, and/or the like as represented by the loss function) for the set of final values or for a difference between each final value of the set of final values (e.g., final values for each of the paths) and a given final or boundary value is determined and the weights and/or parameters of the DNN(s) of the deep BSDE solver are modified to reduce the statistical measure of spread determined on the next training iteration of projection along the plurality of paths. For example, the parameters and/or weights of an initial network being trained to determine an initial value of a system (e.g., portfolio) based on a set of underlying features (e.g., assets) may be modified so as to decrease, minimize, and/or otherwise reduce the value of the statistical measure of spread.

Once the deep BSDE solver satisfies a convergence requirement (e.g., the statistical measure of spread is sufficiently small and/or the number of training iterations has reached a particular number) the resulting value information (e.g., comprising an initial value corresponding to a set of underlying features, a function describing an initial value corresponding to a set of underlying features as a function of the set of underlying features, and/or the like) and/or boundary activation information (e.g., comprising a likelihood that a boundary is activated, timing information regarding when the boundary condition is likely to be activated, information regarding sets of underlying features that are more likely and/or less likely to activate a boundary condition, and/or the like) are provided (e.g., for display to a user via a user computing device, stored in memory for later use, and/or the like). In various embodiments, the DNN(s) of the deep BSDE solver comprises a feedforward DNN. For example, the information within the DNN(s) of the deep BSDE solver moves from the input nodes, through the hidden nodes, and out to the output nodes without forming any cycles or loops within the network. In various embodiments, a function for the initial value corresponding to a set of underlying features is determined with the set of underlying features as the input variables. In other words, the initial values of the underlying features and/or the set of underlying features need not be fixed values and/or a fixed set for each path. For example, different paths may correspond to different initial values of the set of underlying features and/or to different sets of underlying features.

The deep BSDE solver allows for efficient determination of values corresponding to sets of underlying features defined within a bounded domain and having boundary conditions imposed at the boundary of the bounded domain. Moreover, the deep BSDE solver enables the initial value corresponding to the set of underlying features to be learned as a function of the set of underlying features. Thus, a variety of scenarios of sets of underlying features may be considered with only one training instance of the deep BSDE solver. For example, the system corresponding to the sets of underlying features and defined within the bounded domain may be fully described as a result of on training instance of the deep BSDE solver. These features are in contrast to traditional means for determining values for systems defined in a bounded domain and having boundary conditions imposed at the boundary. For example, traditional means for solving systems defined in a bounded domain and having boundary conditions imposed at the boundary are computationally expensive as they require use of a partial differential equation (PDE) finite difference method and/or Monte Carlo methods which are computationally expensive and are only effective for low dimensional problems.

Accordingly, the present disclosure sets forth systems, methods, apparatuses, and computer program products that accurately and computationally efficiently determine and provide the value information and/or boundary activation information corresponding to sets of underlying features of a system defined in a bounded domain and having boundary conditions imposed at the boundary of the bounded domain. In various embodiments, the value information and/or the boundary activation information may correspond to one or more points in time. For example, the one or more points in time may include a final time (e.g., a maturity time of the system). There are many advantages of these and other embodiments described herein. For instance, the computational efficiency of various embodiments of the deep BSDE solver described herein allows for the providing of the value information and/or boundary activation information in real time or near real time with respect to the receipt of a request for such. Thus, embodiments of the deep BSDE solver may be used to inform decisions on relatively short time frames.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which embodiments of the present disclosure may operate to generate and provide value information and/or boundary activation information corresponding to a system based on a set of underlying features (which may be defined and/or may be a variable) defined in a bounded domain and having boundary conditions imposed at the boundary of the bounded domain and/or IUIs configured for providing such information. As illustrated, the example embodiment 100 may include one or more system computing devices 10 and one or more user computing devices 20. The one or more system computing devices 10 and/or one or more user computing devices 20 may be in electronic communication with, for example, one another over the same or different wireless or wired networks 40. For example, a user computing device 20 may provide (e.g., transmit, submit, and/or the like) a request for value and/or boundary activation information for a system to a system computing device 10 via one or more wireless or wired networks 40. For example, a system computing device 10 may provide (e.g., transmit) value and/or boundary activation information regarding a system to a user computing entity 20 via one or more wireless or wired networks 40.

The one or more system computing devices 10 may be embodied as one or more servers, such as that described below in connection with FIG. 2. The one or more system computing devices 10 may further be implemented as local servers, remote servers, cloud-based servers (e.g., cloud utilities), or any combination thereof. The one or more system computing devices 10 may receive, process, generate, and transmit data, signals, and electronic information to facilitate the operations of determining and providing value information (e.g., comprising an initial value corresponding to a set of underlying features, a function describing an initial value corresponding to a set of underlying features as a function of the set of underlying features, and/or the like) and/or boundary activation information (e.g., comprising a likelihood that a boundary is activated, timing information regarding when the boundary condition is likely to be activated, information regarding sets of underlying features that are more likely and/or less likely to activate a boundary condition, and/or the like) for a system defined in a bounded domain and having boundary conditions imposed at a boundary of the bounded domain. In various embodiments, a system computing device 10 may store and/or be in communication with one or more databases. In an example embodiment, the one or more databases may be embodied as one or more data storage devices, such as a Network Attached Storage (NAS) device or devices, or as one or more separate databases or servers. The one or more databases may store information accessed by the system computing device 10 to facilitate the operations of determining and providing value information and/or boundary activation information for the system. For example, the one or more databases may store control signals, device characteristics, and access credentials for one or more of the user computing devices 20.

Figure 3:
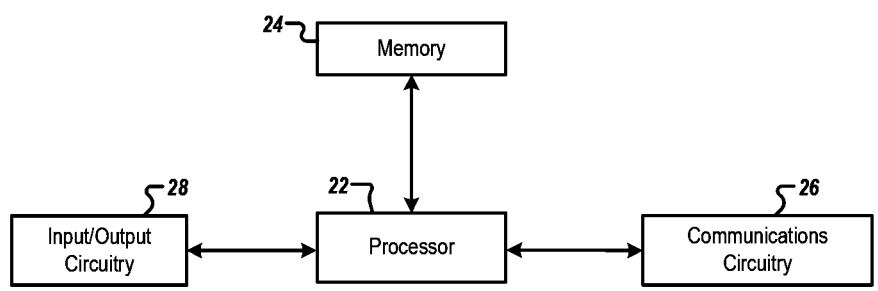
FIG. 3 is a block diagram of a user computing entity that may be specifically configured in accordance with an example embodiment described herein.

The one or more user computing devices 20 may be embodied by any computing devices known in the art, such as those described below in connection with FIG. 3. The system computing device 10 may receive information from, and transmit information to, the one or more user computing devices 20. For example, the system computing device 10 may receive a request for value and/or boundary activation information for a system generated and provided by a user computing device 20. For example, the system computing device may provide value and/or boundary activation information for a system such that a user computing device 20 receives the value and/or boundary activation information for the system. It will be understood that in some embodiments, the one or more user computing devices 20 need not themselves be independent devices, but may be peripheral devices communicatively coupled to other computing devices.

Exemplary Computing Devices

The system computing device 10 described with reference to FIG. 1 may be embodied by one or more computing devices or servers, such as the example system computing device 10 shown in FIG. 2. As illustrated in FIG. 2, the system computing device 10 may include processing circuitry 12, memory 14, communications circuitry 16, input-output circuitry 18, solver circuitry 202, and deep neural network (DNN) circuitry 204, each of which will be described in greater detail below. In some embodiments, the system computing device 10 may further comprise a bus (not expressly shown in FIG. 2) for passing information between various components of the system computing device. The system computing device 10 may be configured to execute various operations described above in connection with FIG. 1 and below in connection with FIGS. 4 and 5.

In some embodiments, the processor 12 (and/or co-processor or any other processing circuitry assisting or otherwise associated with the processor) may be in communication with the memory 14 via a bus for passing information among components of the apparatus. The processor 12 may be embodied in a number of different ways and may, for example, include one or more processing devices configured to perform independently. Additionally or alternatively, the processor may include one or more processors configured in tandem via a bus to enable independent execution of software instructions, pipelining, and/or multithreading. The use of the terms "processor" or "processing circuitry" may be understood to include a single core processor, a multi-core processor, multiple processors of the system computing device 10, remote or "cloud" processors, or any combination thereof.

In an example embodiment, the processor 12 may be configured to execute software instructions stored in the memory 14 or otherwise accessible to the processor. Alternatively or additionally, the processor 12 may be configured to execute hard-coded functionality. As such, whether configured by hardware or software methods, or by a combination of hardware with software, the processor 12 may represent an entity (e.g., physically embodied in circuitry) capable of performing operations according to an embodiment of the present invention while configured accordingly. Alternatively, as another example, when the processor 12 is embodied as an executor of software instructions, the software instructions may specifically configure the processor 12 to perform the algorithms and/or operations described herein when the software instructions are executed.

Memory 14 is non-transitory and may include, for example, one or more volatile and/or non-volatile memories. In other words, for example, the memory 14 may be an electronic storage device (e.g., a computer readable storage medium). The memory 14 may be configured to store information, data, content, applications, software instructions, or the like, for enabling the apparatus to carry out various functions in accordance with example embodiments contemplated herein.

The communications circuitry 16 may be any means such as a device or circuitry embodied in either hardware or a combination of hardware and software that is configured to receive and/or transmit data from/to a network and/or any other device, circuitry, or module in communication with the system computing device 10. In this regard, the communications circuitry 16 may include, for example, a network interface for enabling communications with a wired or wireless communication network. For example, the communications circuitry 16 may include one or more network interface cards, antennas, buses, switches, routers, modems, and supporting hardware and/or software, or any other device suitable for enabling communications via a network 40. Additionally or alternatively, the communication interface 16 may include the circuitry for causing transmission of such signals to a network or to handle receipt of signals received from a network.

In some embodiments, the system computing device 10 may include input/output circuitry 18 in communication configured to provide output to a user and, in some embodiments, to receive an indication of user input. The input/output circuitry 18 may comprise a user interface, such as a display, and may further comprise the components that govern use of the user interface, such as a web browser, mobile application, dedicated client device, or the like. In some embodiments, the input/output circuitry 18 may additionally or alternatively include a keyboard, a mouse, a touch screen, touch areas, soft keys, a microphone, a speaker, and/or other input/output mechanisms or devices. The input/output circuitry 18 may utilize the processor 12 to control one or more functions of one or more of these user interface elements through software instructions (e.g., application software and/or system software, such as firmware) stored on a memory (e.g., memory 14) accessible to the processor 12.

In addition, the system computing device 10 further comprises solver circuitry 202, which includes hardware components designed for acting as a deep BSDE solver. The solver circuitry 202 may utilize processor 12, memory 14, or any other hardware component included in the system computing device 10 to perform these operations, as described in connection with FIGS. 4, 5, and 6 below. The solver circuitry 202 may further utilize communications circuitry 16 to receive value and/or boundary activation information requests and/or provide value and/or boundary activation information (e.g., in response to a request therefor), or may otherwise utilize processor 12 and/or memory 14 to access information/data and/or executable instructions (e.g., software) used to determine value and/or boundary activation information for a system (e.g., information defining a system within a bounded domain, information defining a boundary of the bounded domain, information defining boundary conditions to be imposed at the boundary of the bounded domain, information regarding a plurality of paths, and/or the like) and/or to store value and/or boundary activation information for a system, and/or the like. In an example embodiment, the functionality described herein as being performed by the solver circuitry 202 is performed through the execution executable instructions by the processor 12. In an example embodiment, the solver circuitry 202 comprises one or more graphical processing units (GPUs).

In addition, the system computing device 10 further comprises DNN circuitry 204, which includes hardware components designed for training and/or operating a DNN. The DNN circuitry 204 may utilize processor 12, memory 14, or any other hardware component included in the system computing device 10 to perform these operations, as described in connection with FIG. 4 below. The DNN circuitry 204 may further utilize processor 12 and/or memory 14 to access information/data and/or executable instructions for determining, providing, and/or storing information defining a system within a bounded domain, information defining a boundary of the bounded domain, information defining boundary conditions to be imposed at the boundary of the bounded domain, adjust network weights (e.g., parameters of the functions describing the value corresponding to a set of underlying features as a function of the set of underlying features) through the minimization and/or reduction of a loss function, and/or the like. In an example embodiment, the functionality described herein as being performed by the DNN circuitry 204 is performed through the execution executable instructions by the processor 12. In an example embodiment, the DNN circuitry 204 comprises one or more graphical processing units (GPUs).

Although these components 12-18 and 202-204 may in part be described using functional language, it will be understood that the particular implementations necessarily include the use of particular hardware. It should also be understood that certain of these components 12-18 and 202-204 may include similar or common hardware. For example, the solver circuitry 202 and DNN circuitry 204 may each at times leverage use of the processor 12 or memory 14, but duplicate hardware is not required to facilitate operation of these distinct components of the system computing device 10 (although duplicated hardware components may be used in some embodiments, such as those in which enhanced parallelism may be desired). The use of the term "circuitry" as used herein with respect to components of the model computing device 10 therefore shall be interpreted as including the particular hardware configured to perform the functions associated with the particular circuitry described herein. Of course, while the term "circuitry" should be understood broadly to include hardware, in some embodiments, the term "circuitry" may refer also to software instructions that configure the hardware components of the model computing entity 10 to perform their various functions.

To this end, each of the communications circuitry 16, input/output circuitry 18, solver circuitry 202 and DNN circuitry 204 may include one or more dedicated processors, specially configured field programmable gate arrays (FPGA), and/or application specific interface circuit (ASIC) to perform its corresponding functions, these components may additionally or alternatively be implemented using a processor (e.g., processor 12) executing software stored in a memory (e.g., memory 14). In this fashion, the communications circuitry 16, input/output circuitry 18, solver circuitry 202, and DNN circuitry 204 are therefore implemented using special-purpose components implemented purely via hardware design or may utilize hardware components of the system computing device 10 that execute computer software designed to facilitate performance of the functions of the communications circuitry 16, input/output circuitry 18, solver circuitry 202, and DNN circuitry 204.

The user computing device 20 described with reference to FIG. 1 may be embodied by one or more computing devices, personal computers, desktop computers, client devices (e.g., of the system computing device 10), and/or mobile devices, such as the example user computing device 20 shown in FIG. 3. The illustrated example user computing device 20 includes processing circuitry and/or processor 22, memory 24, communications circuitry 26, and input-output circuitry 28, each of which is configured to be similar to the similarly named components described above in connection with FIG. 2. In various embodiments, the processor 22, memory 24, and input-output circuitry 28 are configured to provide an IUI configured for user interaction (e.g., via the input-output circuitry 28). For example, the IUI may be configured to receive user input initiating a value and/or boundary activation information request and/or to provide (e.g., display and/or audibly provide) value and/or boundary activation information.

In some embodiments, various components of the system computing device 10 and/or user computing device 20 may be hosted remotely (e.g., by one or more cloud servers) and thus need not physically reside on the corresponding computing device 10, 20. Thus, some or all of the functionality described herein may be provided by third party circuitry. For example, a given computing device 10, 20 may access one or more third party circuitries via any sort of networked connection that facilitates transmission of data and electronic information between the computing device 10, 20 and the third party circuitries. In turn, that computing device 10, 20 may be in remote communication with one or more of the other components describe above as comprising the computing device 10, 20.

As will be appreciated based on this disclosure, example embodiments contemplated herein may be implemented by a system computing device 10 and/or user computing device 20. Furthermore, embodiments may take the form of a computer program product on at least one non-transitory computer-readable storage medium (e.g., memory 14, 24) storing software instructions. Any suitable non-transitory computer-readable storage medium may be utilized, some examples of which are non-transitory hard disks, CD-ROMs, flash memory, optical storage devices, and magnetic storage devices. It should be appreciated, with respect to certain system computing devices 10 as described in FIG. 2 or user computing devices 20 as described in FIG. 3, that loading the software instructions onto a computer or apparatus produces a special-purpose machine comprising the means for implementing various functions described herein.

Having described specific components of example system computing devices 10 and user computing devices 20, example embodiments are described below in connection with FIGS. 4-9.

Example Deep BSDE Solver

Figures 4, 4A:
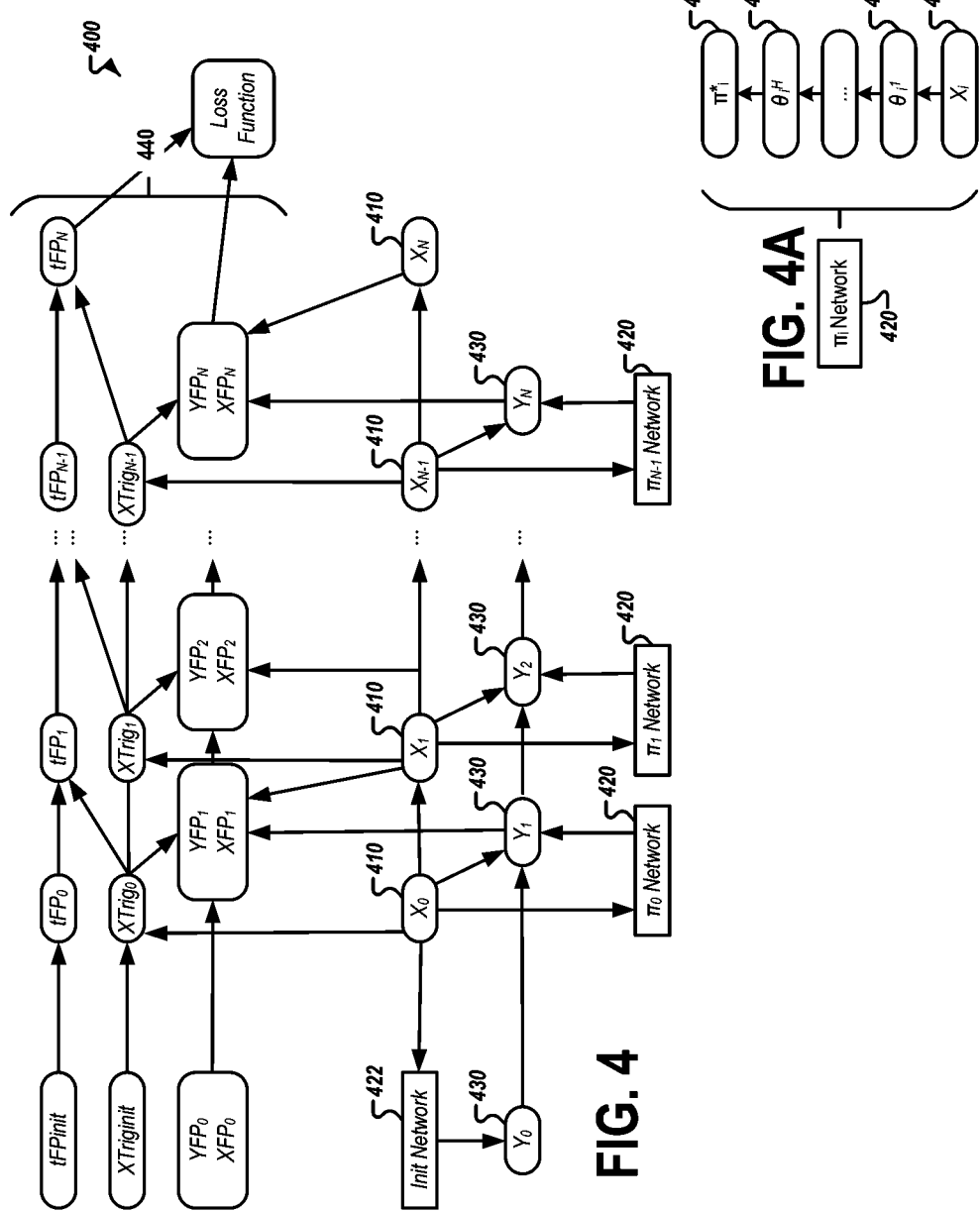
FIG. 4 is a block diagram showing an example architecture of a deep BSDE solver for determining value functions and/or values, in accordance with an example embodiment described herein.
FIG. 4A is a block diagram illustrating an example sub-network of the DNN of the deep BSDE solver, in accordance with an example embodiment described herein.

FIG. 4 provides a block diagram showing an example architecture of a deep BSDE solver 400, in accordance with an example embodiment described herein. For example, FIG. 4 illustrates an example computational graph that may be used as a deep BSDE solver 400, in an example embodiment.

In various embodiments, the deep BSDE solver comprises nodes 410 configured to project an underlying feature vector X forward in time for each time of a time array $\{t_i\}_{0\leq i\leq N}$. In various embodiments, the underlying feature vector X describes the set of underlying features of the system being projected forward in time. For example, the underlying feature vector X may comprise of the prices of different financial assets (e.g., including at least one being monitored for boundary condition activation) corresponding to the system. The final time $t_N=T$ which is the time corresponding to the final value of the boundary condition, may be a maturity time of the financial instrument at which the price of financial instrument is known in terms of the values of the underlying features X and the state of the boundary activations.

In various embodiments, the underlying feature vector $X_{i+1}$ at time $t_{i+1}$ is determined by $X_{i+1}=X_i+b(t_i, X_i)\Delta t_i+a(t_i, X_i)\Delta W^i$, where $X_i\in\mathbb{R}^d$, $\Delta W^i\in\mathbb{R}^d$ is a standard Wiener process with zero mean and unite rate of variance (e.g., Standard Brownian motion), $b(t_i, X_i)\in\mathbb{R}^d$, $a(t_i, X_i)\in\mathbb{R}^{d\times d}$ and $\Delta t_i=t_{i+1}-t_i\in\mathbb{R}$. The functions $b(t_i, X_i)$ and $a(t_i, X_i)$ are defined based on the details of the system being investigated and/or the boundary condition problem being addressed by the particular application. In various embodiments, $\Delta W^i$ is uncorrelated and any correlations are expressed through $a(t_i, X_i)$. In an example embodiment, the boundary condition problem being addressed is a risk-neutral valuation of simple derivatives which obey the Black-Scholes Merton equation with the underlying feature vector X being driven by the Ito process in the risk-neutral measure and $b(t_i, X_i)=r(t_i, X_i)X_i$, where $r(t_i, X_i)$ is the risk-free rate, and $a(t_i, X_i)=\sigma(t_i, X_i)X_i$, where $\sigma(t_i, X_i)$ is the volatility of the underlying features. In various embodiments, $b(t_i, X_i)$, $a(t_i, X_i)$, and/or $\Delta W^i$ may vary between different paths. For example, the plurality of paths of evolving the underlying feature vector X may be defined by $b(t_i, X_i)$, $a(t_i, X_i)$, and/or $\Delta W^i$.

In various embodiments, each node that determines an instance of underlying feature vector $X_i$ provides the instance of the underlying feature vector XL to an input layer 402 of a corresponding sub-network or DNN referred to as a $\pi_i$ network 420. FIG. 4A provides a schematic diagram of a sub-network or DNN for time $t_1$. As indicated, the $\pi_i$ network is configured to receive the underlying feature vector X at the input layer 402 of the $\pi_i$ network. The input layer 402 of the $\pi_i$ network is configured to provide the underlying feature vector $X_i$ to a first hidden layer $\delta_i^1$ 404A. The hidden layers 404 (e.g., 404A, 404H) are configured to perform a transformation of the underlying feature vector $X_i$ to determine and/or generate an output of the $\pi_i$ network. In various embodiments, the $\pi_i$ network is configured to perform the transformation based on the parameters and/or weights of the $\pi_i$ network. In various embodiments, the at network comprises one to ten hidden layers (e.g., four hidden layers). The final hidden layer $\theta_i^H$ 404H is configured to provide the output $\pi_i^*$ to the output layer 406. The output layer 406 is configured to provide the output $\pi_i^*$ to a node of the computational graph of the deep BSDE solver configured to determine and/or calculate a value $Y_i$ corresponding to the underlying features of the system at time $t_i$. In various embodiments, the deep BSDE solver may further comprise an initial network 422 configured to transform the initial underlying feature vector $X_0$ into a corresponding initial value $Y_0$ based on the parameters and/or weights of the initial network 422. For example, the initial network 422 may be configured to be trained (e.g., based on modifications to parameters and/or weights of the initial network 422 in order to minimize a statistical measure and/or loss function) to determine an initial value $Y_0$ corresponding to the initial underlying feature vector $X_0$.

In various embodiments, the deep BSDE solver comprises nodes 430 configured to project a value Y corresponding to the underlying features of the system forward in time for each time of a time array $\{t_i\}_{0\leq i\leq N}$. In an example embodiment where the underlying feature vector X may comprise an indication of the amount of different financial instruments and the prices of different financial assets (e.g., including at least one involved with a boundary behavior and/or to be monitored for boundary condition activation) corresponding to the system (e.g., a portfolio of financial instruments such as options or derivatives on the aforementioned assets, assets, and/or the like), the value Y may be a monetary or other value of the system (e.g., portfolio). In various embodiments, the value $Y_{i+1}$ at time $t_{i+1}$ is determined by $Y_{i+1}=Y_i-f(t_i, X_i, Y_i, \pi_i^*)\Delta t_i+\pi_i^{*T}a(t_i, X_i)\Delta W^i$, where $f(t_i, X_i, Y_i, \pi_i^*)$ is a function corresponding to the particular problem being addressed and $\pi_i^{*T}$ is the transpose of the output $\pi_i^{*T}$ generated and/or determined and provided by the corresponding $\pi_i$ network. In an example embodiment, where the boundary condition problem being addressed is a risk-neutral valuation of simple derivatives which obey the Black-Scholes Merton equation with the underlying feature vector X being driven by the Ito process in the risk-neutral measure and $b(t_i, X_i)=r(t_i, X_i)X_i$, where $r(t_i, X_i)$ is the risk-free rate, $a(t_i, X_i)=\sigma(t_i, X_i)X_i$, where $\sigma(t_i, X_i)$ is the volatility of the underlying features, and $f(t_1, X_i, Y_i, \pi_i^*)=-r(t_1, X_i)Y_i$. Thus, based on the projection of the underlying feature vector X forward in time along a path (defined by $b(t_i, X_i)$, $a(t_i, X_i)$, and/or $\Delta W^i$) and the ret networks (which are individual DNNs or sub-networks of a DNN of the deep BSDE solver), the value Y corresponding to the system (e.g., the underlying features of the system as described by underlying feature vector X) may be projected forward in time from an initial time $t_0$, through at least one intermediate time $t_{i,0<i<N}$, to a final time $t_N=T$. In this context, the value Y that must be satisfied by the system is specified by the boundary constraint (i.e., the final value $Y_T$ of the financial instrument corresponding to final time T, or the rebate value of the instrument once the underlying features activate the boundary condition, whereas the initial value of the instrument $Y_0$ corresponding to the initial time $t_0=0$, is unknown and to be determined).

In various embodiments, the deep BSDE solver comprises nodes 440 configured to monitor whether a boundary condition is activated at time $t_i$; when the boundary condition is activated, record the time $t_i$ at which the boundary condition was activated; determine and store an output underlying feature vector XFP and corresponding output value YFP, which may differ from the underlying feature vector X and corresponding value Y for paths along which the boundary condition is activated. For example, deep BSDE solver may comprise nodes configured to initialize the initial output underlying feature vector $XFP_0$, the corresponding initial output value $YFP_0$, the initial output time $tFP_0$, and the initial boundary condition imposition trigger $XTrig_0$. In an example embodiment, the output underlying feature vector $XFP_0$, the corresponding output value $YFP_0$, the output time $tFP_0$ are initialized such that $tFP_0=t_0$, $XFP_0=X_0$, and $YFP_0=Y_0$. Although the values of to and $X_0$ are known at the time of initialization, the value of $Y_0$, which is assumed to reflect the value of the system Y at time $t_0=0$, is yet unknown. This is due to the boundary constraints on the value of Y, that only specify the value at final time $t_N=T$ and at boundary conditions corresponding to underlying vector X at other times. The initializing network 422, is configured to learn the value of $Y_0$ at the end of training convergence, such that the learned $Y_0$, which when propagated forward in time will satisfy the boundary constraints specified in the problem. In an example embodiment, $Y_0$ is initialized at the initial time $t_0$ with a random value and hence does not need to be known at the time of initialization.

In various embodiments, the boundary condition imposition trigger $XTrig_i$ is a binary variable that may take the value 0.0 (e.g., False) or 1.0 (e.g., True). In various embodiments, the boundary condition imposition trigger is initialized to $XTrig_0=0.0$. At each time $t_i$, the boundary condition imposition trigger $XTrig_i$ is evaluated to determine whether the boundary condition has been activated. For example, the value of $XTrig_i$ at time $t_i$ may be determined by evaluating $$XTrig_i = \begin{cases} XTrig_{i-1} & \text{if } XTrig_{i-1} = 1.0 \\ C_i(t_i, X_i) & \text{else} \end{cases}, \text{where}$$

$$C_i(t_i, X_i) = \begin{cases} 1.0 & X_i \text{ satisfies the Boundary Condition at } t_i \\ 0.0 & \text{else} \end{cases}.$$

The output underlying feature vector $XFP_i$, the corresponding output value $YFP_i$, and the output time $tFP_i$ may then be determined according to $tFP_i=t_i\times(1.0-XTrig_{i-1})+tFP_{i-1}\times XTrig_{i-1}$, $XFP_i=X_i\times(1.0-XTrig_{i-1})+XFP_{i-1}\times XTrig_{i-1}$, and $YFP_i=Y_i\times(1.0-XTrig_{i-1})+YFP_{i-1}\times XTrig_{i-1}$.

Thus, when the boundary condition is activated and/or satisfied, the output time tFP will retain the time at which the boundary condition was activated and/or satisfied and the output underlying feature vector XFP and the corresponding output value YFP will retain the underlying feature vector and the corresponding value at the time the boundary condition was activated and/or satisfied. For example, when the boundary condition is activated and/or satisfied at time $t_{i*}$, $tFP_N=t_{i*}$, $XFP_N=X_{i*}$, and $YFP_N=Y_{i*}$. However, when the boundary condition is not activated and/or satisfied as the system is projected along the corresponding path, $tFP_N=t_N$, $XFP_N=X_N$, and $YFP_N=N$. Thus, the output time both provides an indication of whether the boundary condition was activated and/or satisfied as the system was projected along the corresponding path and, in instances when the boundary condition was activated and/or satisfied, the output time indicates the time at which the boundary condition was activated and/or satisfied.

In various embodiments, a variety of boundary conditions may be utilized, as appropriate for the application. Some example boundary conditions in the example where the system is a portfolio and the underlying features of financial instruments include up-and-out calls, down-and-out calls, up-and-in calls, and down-and-in calls. For example, the boundary condition may be an up-and-out call that is activated and/or satisfied when $X_i$ is equal to or greater than a barrier value. When the boundary condition is an up-and-out call and the boundary condition is activated and/or satisfied, a knocked-in instrument rebate of value $G_i$ is provided and when the boundary condition is not activated and/or satisfied, a final payoff of $\max(X_T-K, 0)$ is provided, where $G_i$ is an instrument dependent value or function of time and K is the strike price. For example, the boundary condition may be a down-and-out call that is activated and/or satisfied when $X_i$ is equal to or less than a barrier value. When the boundary condition is a down-and-out call and the boundary condition is activated and/or satisfied, a knocked-in instrument rebate of value $G_i$ is provided and when the boundary condition is not activated and/or satisfied, a final payoff of $\max(X_T-K, 0)$ is provided. For example, the boundary condition may be an up-and-in call that is activated and/or satisfied when $X_i$ is equal to or greater than a barrier value. When the boundary condition is an up-and-in call and the boundary condition is activated and/or satisfied, a knocked-in instrument value of the vanilla call price value $V(X_i, K, T-t_i)$ is provided, and when the boundary condition is not activated and/or satisfied, a no final payoff is provided. For example, the boundary condition may be a down-and-in call that is activated and/or satisfied when $X_i$ is equal to or less than a barrier value. When the boundary condition is a down-and-in call and the boundary condition is activated and/or satisfied, a knocked-in instrument value of the vanilla call price value $V(X_i, K, T-t_i)$ is provided, and when the boundary condition is not activated and/or satisfied, no final payoff is provided.

In various embodiments, the boundary conditions may evolve with time. For example, the barrier value may change over time and/or be time dependent. For example, the barrier condition may only be applied during particular times (e.g., not applied at times $t_0$ through $t_m$ and then applied for times $t_{m+1}$ through $t_N$.

In various embodiments, the BSDE solver is configured to provide the final output values (e.g., $tFP_N$, $XFP_N$, and $YFP_N$) at the final time $t_N$ T as input to a loss function LF. In various embodiments, the loss function LF may consider the statistical spread of the final output values of the path wise values. For example, the loss function LF may be a measure of statistical spread corresponding to the plurality of paths. In an example embodiment, the loss function $$LF \propto \sum_j \left\| YFP_N^j - g_B(tFP_N^j, XFP_N^j) \right\|^2,$$

where the index j indexes the plurality of paths. The function $g_B(tFP_N, XFP_N)$ encodes the specific boundary condition corresponding to the system. For example, for a knock-out barrier call option, such as an up-and-out or down-and-out boundary condition, $$g_B(tFP_N, XFP_N) = \begin{cases} \max(XFP_N - K, 0.0) & \text{if } tFP_N = t_N \\ 0.0 & \text{if } tFP_N < t_N \end{cases}.$$

In another example, for a knock-in barrier call option, such as an up-and-in or down-and-in boundary condition, $$g_B(tFP_N, XFP_N) = \begin{cases} 0.0 & \text{if } tFP_N = t_N \\ V(XFP_N, K, t_N - tFP_N) & \text{if } tFP_N < t_N \end{cases}.$$

Example Operation of a System Computing Device

Figure 2:
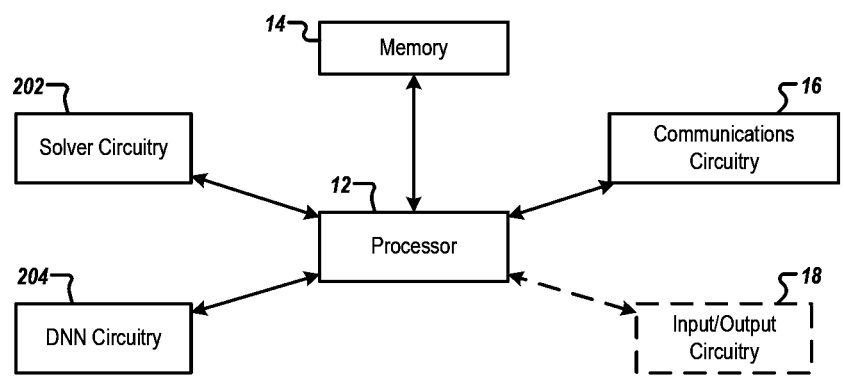
FIG. 2 is a block diagram of a system computing entity that may be specifically configured in accordance with an example embodiment described herein.
Figure 5:
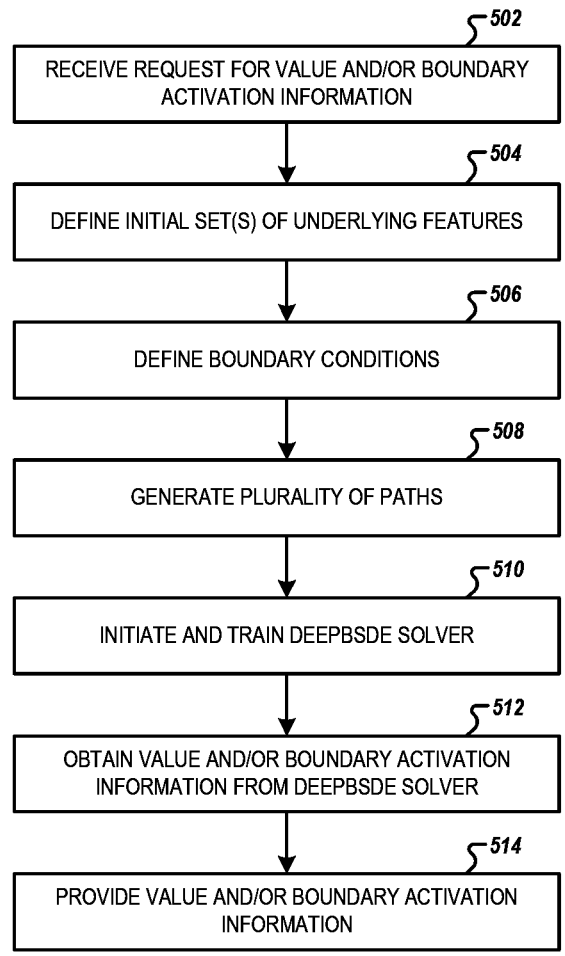
FIG. 5 is a flowchart illustrating operations performed, such as by the system computing entity of FIG. 2 to provide information regarding a system defined within a bounded domain and having boundary conditions imposed at the boundary, in accordance with an example embodiment described herein.

FIG. 5 provides a flowchart illustrating operations performed, such as by the system computing entity 10 of FIG. 2 to provide value information and/or boundary activation information, in accordance with an example embodiment described herein. In various embodiments, value information comprises final time value information comprising a value corresponding to the system at the final time based on the output value for each path (to assess the mismatch between the value from the determined strategy and the targeted final or boundary value, for example), an initial value (e.g., the initial value that leads to a(n approximate)

minimum of the loss function) corresponding to a set of underlying features, a function describing an initial value (e.g., the initial value function that leads to a(n approximate) minimum of the loss function) corresponding to a set of underlying features as a function of the set of underlying features, initial value information from trained parameters or networks (e.g., the initial network 422), as the case might be, for the initial time or intermediate time value associated with the problem based on the determined strategy, and/or the like. In various embodiments, the boundary activation information comprises a likelihood that a boundary is activated, timing information regarding when the boundary condition is likely to be activated, information regarding sets of underlying features that are more likely and/or less likely to activate a boundary condition, and/or the like.

Starting at block 502, a request for value and/or boundary activation information is received. For example, the system computing device 10 may receive a request for value and/or boundary activation information. For example, the system computing device 10 may comprise means, such as processor 12, memory 14, communications interface 16, user interface 18, and/or the like, for receiving a request for value and/or boundary activation information. In various embodiments, the request for value and/or boundary activation information comprises and/or indicates one or more terms and/or underlying features of the system, boundary information, and/or the like for the system for which the value and/or boundary activation information is to be provided. For example, the request for value and/or boundary activation information may include a description of the system (e.g., a portfolio) and/or one or more underlying features (e.g., one or more underlying assets of the portfolio), an initial time (e.g., to), a maturity date or final time (e.g., 7), and/or various other terms of the system or one or more underlying features. In an example embodiment, the request for value and/or boundary activation information may include domain defining and/or boundary condition information such as a boundary type (e.g., up-and-out, down-and-out, up-and-in, down-and-in, and/or the like), a barrier value or a function for determining a barrier value at a particular time, information that may be used to determine the function $g_B(tFP_N, XFP_N)$ encoding the specific boundary condition corresponding to the system, and/or the like.

In an example embodiment, the request is automatically generated by the system computing device 10 (e.g., in response to a set and/or programmed trigger). In various embodiments, the request is generated and provided by a user computing device 20 in response to user interaction with an interactive user interface (IUI) provided via the input-output circuitry 28 of the user computing device 20. For example, the user computing device 20 may provide a value and/or boundary activation information request IUI similar to the example value and/or boundary activation information request form 700 shown in FIG. 7. For example, the user computing device 20 may execute application program code to provide the value and/or boundary activation information request form 700. In various embodiments, the application program code corresponds to a dedicated application; a browser used to access a portal, website, dashboard and/or the like (e.g., provided and/or hosted by the system computing device 10 and/or the like); or other application. In various embodiments, the value and/or boundary activation information request form 700 comprises one or more fillable and/or selectable system information/data fields 702. For example, the user may provide input (e.g., via input-output circuitry 28) to cause one or more fillable and/or selectable system information/data fields 702 to be populated by the user computing device 20. The user may then select (e.g., via input-output circuitry 28) a selectable submit feature 704 (e.g., a submit button, icon, and/or the like) to cause the user computing device 20 to generate the request for the value and/or boundary activation information and provide (e.g., transmit) the request for the value and/or boundary activation information such that the system computing device 10 receives the request for the value and/or boundary activation information. For example, the user computing device 20 may comprise means, such as processor 22, memory 24, communications interface 26, input-output circuitry 28, and/or the like, for receiving user input (e.g., via a value and/or boundary activation information request form 700), generate a request for value and/or boundary activation information, and provide the request for the value and/or boundary activation information.

At block 504, a one or more initial sets of underlying features are defined. For example, one or more initial underlying feature vectors $X_0$ may be defined. In an example embodiment, the one or more initial sets of underlying features are defined based on information regarding the system and/or underlying features provided in the request for value and/or boundary activation information. In an example embodiment, a number of paths are evaluated based on the same initial set of underlying features. For example, each path may start with the same initial underlying feature vector $X_0$. In such an embodiment, the value information may provide a numerical value associated with the initial set of underlying features and the boundary activation information may provide a likelihood of the boundary being activated for the initial set of underlying features, timing regarding when the boundary is likely to be activated for the initial set of underlying features, and/or the like. In an example embodiment, multiple initial sets of underlying features are defined. For example, a first path may correspond to a first initial set of underlying features and a second path may correspond to a second initial set of underlying features. In another example, a first initial set of underlying features may be projected along both the first and second paths and a second initial set of underlying features may also be projected along both the first and second paths (as defined by $b(t_i, X_i)$, $a(t_i, X_i)$, and/or $\Delta W^i$) each path may start with the same initial underlying feature vector $X_0$. In such an embodiment, the value information may provide a value associated with system as a function of the initial set of underlying features and the boundary activation information may provide a likelihood of the boundary being activated as a function of the initial set of underlying features, timing regarding when the boundary is likely to be activated as a function of the initial set of underlying features, an indication of what properties of an initial set of underlying features is more or less likely to result in the boundary being activated, and/or the like. For example, the system computing device 10 may define one or more initial sets of underlying features. For example, the system computing device 10 may comprise means, such as processor 12, memory 14, solver circuitry 202, and/or the like, for defining one or more initial sets of underlying features.

At block 506, boundary conditions are defined. In various embodiments the boundary conditions are defined based on the domain defining and/or boundary condition information provided in the request. For example, the domain defining and/or boundary condition information such as a boundary type, a barrier value or a function for determining a barrier value at a particular time, information that may be used to determine the function $g_B(tFP_N, XFP_N)$ encoding the specific boundary condition corresponding to the system, and/or the like provided in the request may be used to define the boundary conditions. For example, the function $g_B(tFP_N, XFP_N)$ may be defined, the function $C_i(t_i, X_i)$ may be defined, and/or the like. For example, the system computing device 10 may define the boundary conditions for the system. For example, the system computing device 10 may comprise means, such as processor 12, memory 14, solver circuitry 202, and/or the like, for defining the boundary conditions for the system. In various embodiments, the boundary conditions may define a complete boundary about the domain, a partial boundary (e.g., just an upper boundary or just a lower boundary), a static boundary (e.g., a boundary not changing with time), a time dependent boundary (e.g., a boundary that evolves with and/or is a function of time $t_i$, a boundary that is only present at particular times $t_i$, and/or the like.

At block 508, a plurality of paths may be determined. For example, in the above example, a plurality of paths may be determined by defining $b(t_i, X_i)$, $a(t_i, X_i)$, and $\Delta W^i$ for each path. For example, the system computing device 10 may determine one or more paths for each initial set of underlying features. For example, the parameters to be used to evolve an initial set of underlying features may be determined and/or defined in a stochastic manner. For example, the system computing device 10 may comprise means, such as processor 12, memory 14, solver circuitry 202, and/or the like, for determining a plurality of paths. In various embodiments, M+1 paths are determined, where M+1 is in the range of 200 to 5,000. In various embodiments, M+1 is larger than 5,000 or smaller than 200, as appropriate for the application.

At block 510, the deep BSDE solver is initiated. For example, the initial set(s) of underlying features defined, the boundary conditions defined, and the plurality of paths determined may be provided to the deep BSDE solver. The deep BSDE solver may then be executed to project the initial set(s) of underlying features along the determined paths and determine whether and/or when the boundary conditions are activated. For example, the deep BSDE solver may be trained using the initial set(s) of underlying features, boundary conditions, and paths to generate the value and/or boundary activation information and/or information that may be used to determine and/or generate the value and/or boundary activation information. For example, the system computing device 10 may initiate the deep BSDE solver, provide initial set(s) of underlying features, boundary conditions, and paths to the deep BSDE solver, and cause the deep BSDE solver to be executed. For example, the system computing device 10 may comprise means, such as processor 12, memory 14, solver circuitry 202, DNN circuitry 204, and/or the like, for initiating the deep BSDE solver, providing initial set(s) of underlying features, boundary conditions, and paths to the deep BSDE solver, and causing the deep BSDE solver to be executed.

At block 512, the value and/or boundary activation information is obtained. In an example embodiment, the value and/or boundary activation information is provided as output of the deep BSDE solver. In an example embodiment, the value and/or boundary activation information is generated and/or determined based on the output of the deep BSDE solver. For example, the system computing device 10 may obtain the value and/or boundary activation information. For example, the system computing device 10 may comprise means, such as processor 12, memory 14, solver circuitry 202, and/or the like, for obtaining the value and/or boundary activation information.

At block 514, the value and/or boundary activation information is provided. For example, the value and/or boundary activation information may be provided such that the user computing entity 20 receives the value and/or boundary activation information. For example, the system computing device 10 may provide the value and/or boundary activation information such that the user computing entity 20 receives the value and/or boundary activation information. For example, the system computing device 10 may comprise means, such as processor 12, memory 14, communications interface 16, and/or the like, for providing the value and/or boundary activation information such that the user computing entity 20 receives the value and/or boundary activation information.

Figure 8:
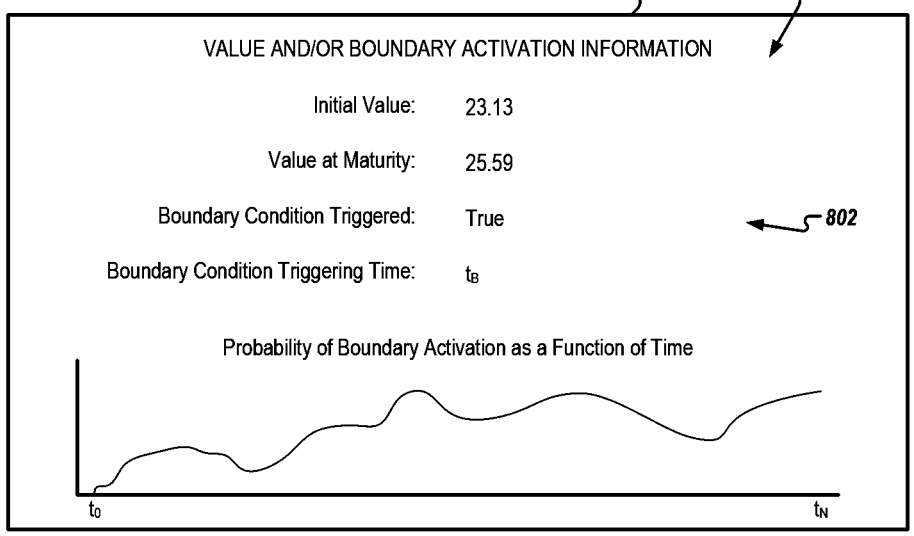
FIG. 8 illustrates an example IUI providing information regarding a system defined within a bounded domain and having boundary conditions imposed at the boundary, in accordance with an example embodiment described herein.

In various embodiments, the user computing device 20 receives the value and/or boundary activation information. For example, the user computing device 20 may comprise means, such as processor 22, memory 24, communications interface 26, and/or the like for receiving the value and/or boundary activation information. The user computing device 20 may register and/or process the value and/or boundary activation information (e.g., via processor 22) and generate and/or render a representation of at least a portion of the value and/or boundary activation information. For example, a graphical and/or tabular representation of at least a portion of the value and/or boundary activation information may be generated and/or rendered. The representation of the value and/or boundary activation information may then be provided (e.g., displayed) via the input-output circuitry 28 of the user computing device 20. For example, the user computing device 20 may execute application program code to provide a value and/or boundary activation information IUI 800 via the input-output circuitry 28, an example version of which is shown in FIG. 8. In various embodiments, the application program code corresponds to a dedicated application; a browser used to access a portal, website, dashboard and/or the like (e.g., provided and/or hosted by the system computing device 10 and/or the like); or other application. As shown in FIG. 8, a value and/or boundary activation IUI 800 may comprise a representation 802 of at least a portion of the value and/or boundary activation information. For example, the representation 802 provides an initial value, value at maturity, information regarding whether the boundary is likely to be activated, a how the likelihood of a boundary being activated changes over time, and/or the like.

In various embodiments, a human or machine user of a user computing device 20 may use at least a portion of the value and/or boundary activation information to make one or more decisions. For example, the human or machine user may choose a price for a portfolio, whether or not to purchase a portfolio (e.g., to initiate a computer-implemented process to cause the portfolio to be purchased), and/or the like based on at least a portion of the value and/or boundary activation information and/or a displayed representation thereof. In an example embodiment, the decisions may need to be made on a relatively short time frame (e.g., less than five minutes, less than fifteen minutes, less than half an hour, and/or the like). In various embodiments, the value and/or boundary activation information are generated and provided in real time or near real time, by the system computing device 10, with respect to the receiving of the request for the value and/or boundary activation information by the system computing device 10.

In an example embodiment, the user is a model validation machine user that is a model validation module, application, program, and/or the like configured to compare at least a portion of the value and/or boundary activation information to model determined value and/or boundary activation information to validate the model and/or the model determined portfolio value and/or boundary activation information. For example, a model that is external to the deep BSDE solver may generate model determined value and/or boundary activation information that corresponds to the deep BSDE generated value and/or boundary activation information. For example, the model determined value and/or boundary activation information may include the initial value, the portfolio value at one or more times, and/or the like for a portfolio that is the same as and/or similar to the portfolio(s) of the paths used to train the deep BSDE solver. The model may be part of a line-of-business (LOB) program package or may be another model that is otherwise separate from the deep BSDE solver. In an example embodiment, the model validation machine user may comprise computer executable program code operating on the system computing device 10, a user computing device 20, and/or the like.

The model validation machine user compares one or more elements of the model determined value and/or boundary activation information and the deep BSDE solver determined value and/or boundary activation information to determine if the model determined value and/or boundary activation information corresponding to the deep BSDE solver determined value and/or boundary activation information satisfies a similarity requirement. In an example embodiment, if the ratio of an initial value and/or likelihood of boundary activation, for example, of the model determined portfolio value information to the initial value and/or likelihood of boundary activation based on the deep BSDE solver determined value and/or boundary activation information is within a defined range (e.g., 0.8 to 1.25, 0.85 to 1.17, 0.9 to 1.11, 0.95 to 1.05, 0.98 to 1.02, 0.99 to 1.01, and/or the like), it may be determined that the model determined value and/or boundary activation information corresponding to deep BSDE solver determined value and/or boundary activation information satisfies the similarity requirement. Similarly, if the ratio of the initial value and/or likelihood of boundary activation of the model determined value and/or boundary activation information to the initial value and/or likelihood of boundary activation determined based deep BSDE solver initial value and/or likelihood of boundary activation is not within the defined range, the model validation machine user may determine that the similarity requirement is not satisfied. In an example embodiment, if the absolute value of the difference between the initial value and/or likelihood of boundary activation of the model determined value and/or boundary activation information to the initial value and/or likelihood of boundary activation determined based on the deep BSDE solver determined value and/or boundary activation information divided by some value (e.g., the initial value system, the initial value of the system, and/or the like as determined based on the portfolio determined or deep BSDE solver determined value and/or boundary activation information) is less than a threshold value, it may be determined that the similarity requirement is satisfied. Similarly, if the absolute value of the difference between the initial value and/or likelihood of boundary activation of the model determined value and/or boundary activation information to the initial value and/or likelihood of boundary activation determined based on the deep BSDE solver determined value and/or boundary activation information divided by some value (e.g., the initial value system, the initial value of the system, and/or the like as determined based on the portfolio determined or deep BSDE solver determined value and/or boundary activation information) is not less than the threshold value, the model validation machine user may determine that the similarity requirement is not satisfied. Various similarity requirements may be considered in various embodiments, as appropriate for the application.

When the similarity requirement is satisfied, the model validation machine user may cause the deep BSDE solver value and/or boundary activation information to be stored, a log to be updated indicating that the similarity requirement was satisfied, and/or the like. When the similarity requirement is not satisfied, the model validation machine user may cause the deep BSDE solver value and/or boundary activation information to be stored, a log to be updated indicating that the similarity requirement was not satisfied, generate and cause an alert to be provided (e.g., via the IUI of the user computing device 20, via an email, instant message, and/or the like), and/or otherwise provide feedback to one or more human users or other machine users that the similarity requirement was not satisfied. In an example embodiment, providing the alert includes causes a representation of at least a portion of the value and/or boundary activation information to be provided (e.g., displayed) via the input-output circuitry 28 of the user computing device 20, a representation of at least a portion of the model determined portfolio value information/data to be provided (e.g., displayed) via the input-output circuitry 28 of the user computing device 20, an identification of the model that did not satisfy the similarity requirement, information/data identifying the system for which the model results that did not satisfy the similarity requirement, an indication that the similarity requirement was not satisfied, and/or the like, and/or various combinations thereof.

Figure 6:
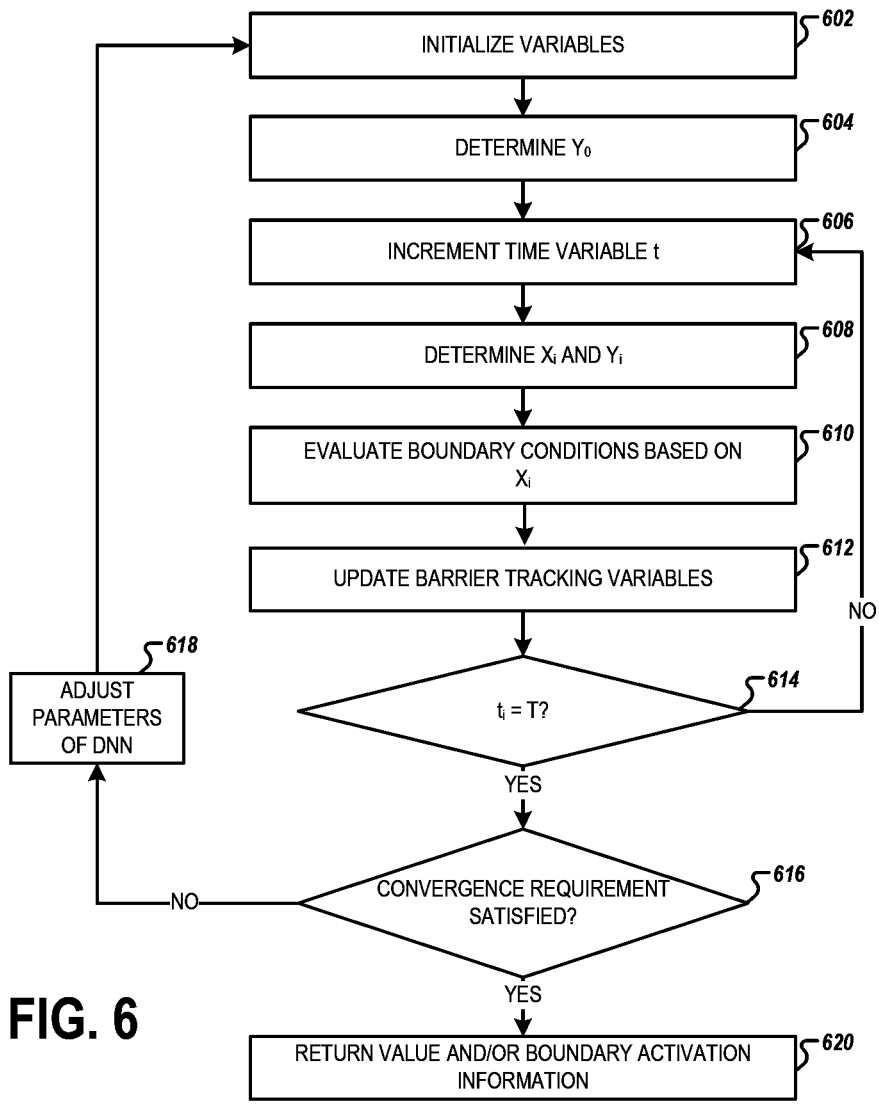
FIG. 6 is a flowchart illustrating operations performed, such as by the system computing entity of FIG. 2 to train the deep BSDE solver to generate the information regarding a system defined within a bounded domain and having boundary conditions imposed at the boundary, in accordance with an example embodiment described herein.

FIG. 6 provides a flowchart illustrating operations performed, such as by the system computing entity 10 of FIG. 2 to train a deep BSDE solver to obtain value and/or boundary activation information for a system. For example, the operations shown in FIG. 6 may be performed as part of block 510. Starting at block 602, variables, parameters, weights, and/or the like of the deep BSDE solver are initialized. In various embodiments, the variables, parameters, weights, and/or the like of the deep BSDE solver comprise the parameters and/or weights of the DNN (e.g., the ret networks 420 and initial network 422). In various embodiments, the variables, parameters, weights, and/or the like of the deep BSDE solver comprise $b(t_i, X_i)$, $a(t_i, X_i)$, and/or $\Delta W^i$ for each path and/or one or more initial underlying feature vectors $X_0$. In various embodiments, the variables, parameters, weights, and/or the like of the deep BSDE solver comprise $g_B(tFP_N, XFP_N)$ and/or $C_i(t_i, X_i)$. In various embodiments, the variables, parameters, weights, and/or the like of the deep BSDE solver comprise tFPinit, XTriginit, XFPinit, YFPinit, and/or the like. For example, various variables, parameters, weights, and/or the like of the BSDE solver may be initialized based on the initial set(s) of underlying features, paths, boundary conditions, and/or the like provided to the BSDE (e.g., at block 510). In an example embodiment, the boundary condition is not evaluated at the initial time $t_0$ and the initial output underlying feature vector $XFP_0$, the corresponding initial output value $YFP_0$, the initial output time $tFP_0$, and the initial boundary condition imposition trigger $XTrig_0$ are initialized such that $tFP_0=t_0$, $XFP_0=X_0$, $YFP_0=Y_0$, and $XTrig_0=0.0$. For example, the system computing device 10 may initialize various variables, parameters, weights, and/or the like of the deep BSDE solver. For example, the system computing device 10 may comprise means, such as processor 12, memory 14, solver circuitry 202, DNN circuitry 204, and/or the like for initializing various variables, parameters, weights, and/or the like of the deep BSDE solver.

At block 604, for each path (if paths are being executed in batches and/or mini-batches), the initial value $Y_0$ for each path is determined. For example, the initial network 422 may be used to determine the initial value $Y_0$ for each path based on the corresponding initial underlying feature vector $X_0$. For fixed $X_0$ or when desired to start with constant $Y_0$, $Y_0$ is a parameter to be optimized through the training of the initial network 422. For example, the system computing device 10 may be configured to train the initial network 422 to determine an initial value $Y_0$ for one or more paths. For example, the system computing device 10 may comprise means, such as processor 12, memory 14, solver circuitry 202, DNN circuitry 204, and/or the like for training the initial network 422 to determine an initial value $Y_0$ for one or more paths.

At block 606, the time is incremented. For example, the time may be incremented from the initial time $t_0$ to a first time $t_1$. In general, the time may be incremented from time $t_i$ to an immediately following time $t_{i+1}$ of a time array $\{t_i\}_{0 \leq i \leq N}$. For example, the index i may be incremented to i+1. For example, the system computing device 10 may increment the time. For example, the system computing device 10 may comprise means, such as processor 12, memory 14, solver circuitry 202, and/or the like for incrementing the time.

At block 608, for each path (if paths are being executed in batches and/or mini-batches), the underlying feature vector $X_i$ for the current time ($t_i$) and the corresponding value $Y_i$ are determined. For example, the underlying feature vector for $X_i$ each path may be determined based on the previous underlying feature vector $X_{i-1}$ and the corresponding path (e.g., comprise $b(t_{i-1}, X_{i-1})$, $a(t_{i-1}, X_{i-1})$, and $\Delta W^{i-1}$) according to $X_i = X_{i-1} + b(t_{i-1}, X_{i-1})\Delta t_{i-1} + a(t_{i-1}, X_{i-1})\Delta W^{i-1}$. For example, the value $Y_i$ for each path may be determined based on the transformation of the corresponding underlying feature vector $X_{i-1}$ to an output $\pi_{i-1}^*$ by a corresponding at network. For example, the value $Y_i$ for each path may be determined based on $a(t_{i-1}, X_{i-1})$, and $\Delta W^{i-1}$ for the corresponding path and $f(t_{i-1}, X_{i-1}, Y_{i-1}, \pi_{i-1}^*)$ for the problem being addressed such that $Y_i = Y_{i-1} - f(t_{i-1}, X_{i-1}, Y_{i-1}, \pi_{i-1}^*)\Delta t_{i-1} + \pi_{i-1}^{*T} a(t_{i-1}, X_{i-1})\Delta W^{i-1}$. For example, the system computing device 10 may determine the underlying feature vector $X_i$ and the value $Y_i$ for each path at time $t_i$. For example, the system computing device 10 may comprise means, such as processor 12, memory 14, solver circuitry 202, DNN circuitry 204, and/or the like for determining the underlying feature vector $X_i$ and the value $Y_i$ for each path at time $t_i$.

At block 610, the boundary conditions may be evaluated for each path based on the underlying feature vector $X_i$ for the respective path at time $t_i$. For example, if $XTrig_{i-1} = 0.0$, it may be determined whether the underlying feature vector $X_i$ for the respective path at time $t_i$ satisfies the boundary condition (e.g., is equal to or greater than an upper boundary barrier value, is equal to or less than a lower boundary barrier value, and/or the like). For example, the value $$C_i(t_i, X_i) = \begin{cases} 1.0 & \text{if } X_i \text{ satisfies the Boundary Condition at } t_i \\ 0.0 & \text{else} \end{cases}$$

In an example embodiment, if $XTrig_{i-1} = 1.0$ for a path, the boundary conditions are not evaluated for that path. For example, the system computing device 10 may evaluate the boundary conditions for each path based on the underlying feature vector $X_i$ for the respective path at time $t_i$ to determine if the boundary condition is activated for the respective path. For example, the system computing device 10 may comprise means, such as processor 12, memory 14, solver circuitry 202, and/or the like for evaluating the boundary conditions for each path based on the underlying feature vector $X_i$ for the respective path at time $t_i$ to determine if the boundary condition is activated for the respective path.

At block 612, the boundary activation tracking variables for each path are updated based on the evaluation of whether the underlying feature vector $X_i$ for the respective path at time $t_i$ activate the boundary conditions. In various embodiments, the boundary activation tracking variables for a path comprise the boundary condition imposition trigger $XTrig_i$, the output underlying feature vector $XFP_i$, the corresponding output value $YFP_i$, and the output time $tFP_i$. For example, the boundary condition imposition trigger $XTrig_i$ at time $t_i$ may be determined for each path based on, for example $$XTrig_i = \begin{cases} XTrig_{i-1} & \text{if } XTrig_{i-1} = 1.0 \\ C_i(t_i, X_i) & \text{else} \end{cases}.$$

The output underlying feature vector $XFP_i$, the corresponding output value $YFP_i$, and the output time $tFP_i$ may then be determined according to, $XFP_i = X_i \times (1.0 - XTrig_{i-1}) + XFP_{i-1} \times XTrig_{i-1}$, $YFP_i = Y_i \times (1.0 - XTrig_{i-1}) + YFP_{i-1} \times XTrig_{i-1}$, and $tFP_i = t_i \times (1.0 - XTrig_{i-1}) + tFP_{i-1} \times XTrig_{i-1}$. For example, the system computing device 10 may determine the boundary activation tracking variables (e.g., $XTrig_i$, $XFP_i$, $YFP_i$, and $tFP_i$) for each path for time $t_i$ based on the evaluation of whether the system being evolved along a respective path activates the boundary condition at time $t_i$. For example, the system computing device 10 may comprise means, such as processor 12, memory 14, solver circuitry 202, and/or the like, for determining the boundary activation tracking variables (e.g., $XTrig_i$, $XFP_i$, $YFP_i$, and $tFP_i$) for each path for time $t_i$.

At block 614, it is determined whether the current time $t_i$ is equal to the final time or maturity time T In various embodiments, $t_N = T$. Thus, in an example embodiment, determine whether $t_i = T$ comprises determining whether the index i=N. For example, the system computing device 10 may determined whether the current time $t_i$ is equal to the final time or maturity time T. For example, the system computing device 10 may comprise means, such as processor 12, memory 14, solver circuitry 202, and/or the like, for determining whether the current time $t_i$ is equal to the final time or maturity time T.

When it is determined, at block 614, that the current time $t_i$ is not equal to the final time or maturity time T, the process returns to block 606 and the time variable is incremented such that $t_i$ is incremented to $t_{i+1}$ or, in other words, the index i is incremented from i to i+1. The process may then continue to evaluate the remainder of each path until the final time or maturity time Tis evaluated.

When it is determined, at block 614, that the current time $t_i$ is equal to the final time or maturity time T, the process continues to block 616. At block 616, it is determined if a convergence requirement is satisfied. For example, the system computing device 10 may determine if the convergence requirement is satisfied. For example, the system computing device 10 may comprise means, such as processor 12, memory 14, solver circuitry 202, DNN circuitry 204, and/or the like, for determining if the convergence requirement is satisfied. In an example embodiment, the convergence requirement is a defined maximum number of iterations. In an example embodiment, the convergence requirement is a spread threshold requirement corresponding to a statistical measure of spread (e.g., variance, standard deviation, and/or the like) of the output values. For example, the spread threshold requirement may be satisfied when the statistical measure of spread of the set of output values is smaller than a spread threshold. For example, the loss function LF may be evaluated and it may be determined if the value determined for the loss function LF is less than a threshold value and/or is approaching an asymptote. For example, a statistical measure of spread (e.g., the loss function $$LF \propto \sum_j \left\| YFP_N^j - g_B(tFP_N^j, XFP_N^j) \right\|^2$$

of the set of output values may be determined and compared to a spread threshold to determine if the spread threshold requirement (and thus the convergence requirement) is satisfied. For example, the convergence requirement may correspond to the value of the loss function for the paths being no more than a threshold value or the value of the loss function for the paths being minimized.

When, at block 616, it is determined that the convergence requirement is not satisfied, the process continues to block 618. At block 618, the weights and/or parameters Oi of the DNN of the deep BSDE solver (e.g., the initial network 422 and the $\pi_i$ networks 420) are modified, adjusted, refined, and/or the like. For example, a loss function may be determined and the loss function (and/or a gradient thereof) may be used to modify, adjust, refine, and/or the like the weights and/or parameters Oi of the of the DNN of the deep BSDE solver. For example, in an example embodiment, a stochastic gradient descent algorithm may be used to modify, adjust, refine, and/or the like the weights and/or parameters Oi of the DNN of the deep BSDE solver (e.g., the initial network 422 and the $\pi_i$ networks 420) to minimize the loss function. For example, the system computing device 10 may modify, adjust, refine, and/or the like the weights and/or parameters Oi of the DNN of the deep BSDE solver. For example, the system computing device 10 may comprise means, such as processor 12, memory 14, solver circuitry 202, DNN circuitry 204, and/or the like, for modifying, adjusting, refining, and/or the like the weights and/or parameters Oi of the DNN of the deep BSDE solver.

When, at block 616, it is determined that the convergence requirement is satisfied, the process continues to block 618. At block 618, the value and/or boundary activation information are determined (e.g., based on the output of the deep BSDE solver). For example, the system computing device 10 may determine value and/or boundary activation information. For example, the system computing device 10 may comprise means, such as processor 12, memory 14, solver circuitry 202, DNN circuitry 204, and/or the like, for determining value and/or boundary activation information. In various embodiments, value information comprises final time value information comprising a value corresponding to the system at the final time based on the output value for each path (to assess the mismatch between the value from the determined strategy and the targeted final or boundary value, for example), an initial value (e.g., the initial value that leads to a(n approximate) minimum of the loss function) corresponding to a set of underlying features, a function describing an initial value (e.g., the initial value function that leads to a(n approximate) minimum of the loss function) corresponding to a set of underlying features as a function of the set of underlying features, initial value information from trained parameters or networks (e.g., the initial network 422), as the case might be, for the initial time or intermediate time value associated with the problem based on the determined strategy, and/or the like. In various embodiments, the boundary activation information comprises a likelihood that a boundary is activated, timing information regarding when the boundary condition is likely to be activated, information regarding sets of underlying features that are more likely and/or less likely to activate a boundary condition, and/or the like.

For example, in an embodiment in which all the paths correspond to the same initial set of underlying features $X_0$, $Y_0$ is determined as the parameter value which, if used as initial value for the strategy, leads to an approximate minimum of measure of statistical spread and/or the loss function. Similarly, on a generated set of paths for $X_i$, the mismatch between final or boundary strategy value Y and targeted final or boundary value can be generated as an output to analyze the behavior of the determined strategy. Similarly, a likelihood of a system activating a boundary condition may be determined by performing a statistical analysis of how many of the M+1 paths activated the boundary condition, the time at which paths that activated the boundary condition activated the boundary condition, the initial underlying feature vectors of paths that activated the boundary condition, and/or the like.

Figure 9:
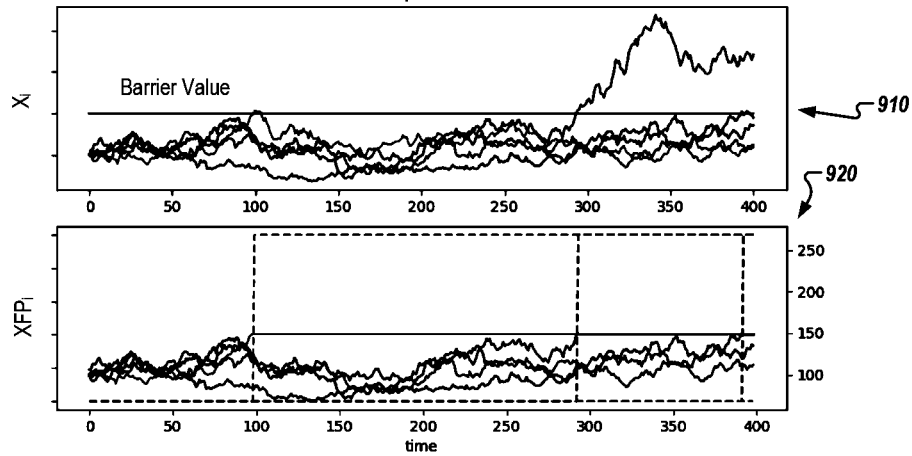
FIG. 9 provides a table that demonstrates the effectiveness of two example embodiments of the backward DNN solver compared to results available in the literature for a single instrument.

FIG. 9 provides a first plot 910 that illustrates the underlying feature vector $X_i$ for a plurality of paths through time that all have the same initial underlying feature vector $X_0$ and an upper boundary shown by the horizontal line and having a barrier value. A second plot 920 illustrates the output underlying feature vector $XFP_i$ for the plurality of paths shown in the first plot 910. As can be seen by comparing the first and second plots 910, 920, for paths that activate the boundary condition, the activation of the boundary condition is identified and/or logged and the output underlying feature vector $XFP_i$ stops evolving. The output time $tFP_i$ and the output value $YFP_i$ also stops evolving once the boundary condition has been activated. Thus, based on the output time $tFP_i$, output underlying feature vector $XFP_i$, and the output value $YFP_i$ for the M considered paths, the boundary activation information may be determined. Similarly, based on the output value $YFP_i$ for the M considered paths, behavior of the determined strategy may be determined. Similarly, based on the learned parameter or network for Y0, the initial value (function) may be analyzed. The value and/or boundary activation information may be stored (e.g., in memory 14) and/or the like such that at block 512 the value and/or boundary activation information may be obtained. Moreover, as the output time $tFP_i$, output underlying feature vector $XFP_i$, and the output value $YFP_i$, and boundary condition imposition trigger $XTrig_i$ stop evolving once the boundary condition has been activated, in various embodiments, the computational efficiency of the deep BSDE solver is increased.

FIGS. 5 and 6 illustrate flowcharts describing sets of operations performed by apparatuses, methods, and computer program products according to various example embodiments. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Technical Advantages

A wide variety of boundary condition problems exist, such as determining the electric field within an electrostatic region, computation of radio wave attenuation in the atmosphere, solving the Einstein field equations in the vicinity of a black hole, determining the temperature profile of a rod connecting two elements at set temperatures, pricing financial instruments with boundary behaviors, etc. Thus, there are a variety of situations in the natural sciences, engineering, and other fields where models corresponding to bounded domains with boundary conditions are imposed at the boundary are considered. Traditional methods for computations for boundary condition problems include partial differential equation (PDE) methods, which require significant memory and computational resources and are only capable of handling low dimensional problems, and Monte Carlo methods, which are computationally expensive, may fail to accurately model rare events, and cannot effectively solve non-linear problems or problems with a large number of dimensions. Thus, a technical problem exists as to how to computationally efficiently address boundary condition problems.

Various embodiments provide a technical solution to this technical problem through the deep BSDE solver. For example, the deep BSDE solver may provide value and/or boundary activation information for a particular initial set of underlying feature vectors or as a function of the initial set of underlying feature vector, where the initial set of underlying feature vector comprises at least one underlying feature that is defined within a bounded domain having boundary conditions imposed at a boundary of the bounded domain. In particular, the deep BSDE solver may provide the value and/or boundary activation information through one training instance of the deep BSDE solver.

For example, embodiments of the present disclosure enable the consideration of multidimensional systems comprising underlying features that comprise that are defined within a bounded domain having boundary conditions imposed at a boundary of the bounded domain. For example, due to the computational efficiency of the described deep BSDE solver, such systems may be considered without requiring overwhelming computation resources. Thus, various embodiments described herein enable modelling of values and boundary activation behavior corresponding to systems comprising underlying features that defined within a bounded domain having boundary conditions imposed at a boundary of the bounded domain in a manner that was previously computationally untenable. Various embodiments of the deep BSDE solver therefore provide an improvement in the art and a technical improvement of increased computational efficiency compared to techniques known in the art for determining a value and/or boundary activation behavior corresponding to an underlying feature defined within a bounded domain having boundary conditions imposed at a boundary of the bounded domain.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for determining and providing value information and/or boundary activation information for a system defined in an at least partially bounded domain and having boundary conditions imposed at a boundary of the bounded domain, the method comprising:

determining, by one or more processors, a plurality of paths for the system through at least a portion of the bounded domain based on an initial set of underlying features and a path evolution determined for each path, each path corresponding to a set of times comprising an initial time, a final time, and one or more intermediate times between the initial time and the final time, wherein the set of underlying features corresponds to respective financial values of a set of assets;

causing, by the one or more processors, a deep backward stochastic differential equation (deep BSDE) solver to be trained until a convergence requirement is satisfied by:
for each time step and for each path:
determining the set of underlying features and a value corresponding to the set of underlying features,
determining, based on the set of underlying features, whether a boundary condition has been activated for the path, and
when it is determined that the boundary condition has been activated for a first time for the path, updating an output value for the path based on the boundary condition and an output time based on the time step at which the boundary condition was activated for the path,
when the boundary condition was not activated for the path prior to the path reaching the final time, updating the output value for the path based on a final value corresponding to the set of underlying features at the final time,
defining a set of output values comprising the output value for each path and determining one or more statistical measures of spread based on the set of output values, and
modifying one or more parameters of a DNN of the deep BSDE solver based on the one or more statistical measures of spread;
after the convergence requirement is satisfied, determining, by the one or more processors, at least one of (a) value information comprising a value corresponding to the system at the initial time and/or at one or more intermediate times based on the values and features for each path or (b) boundary activation information comprising a likelihood of boundary activation;
causing, by the one or more processors, at least a portion of the at least one of (a) value information or (b) boundary activation information to be provided such that a user computing device receives the at least a portion of the at least one of (a) value information or (b) boundary activation information and provides a representation of the at least a portion of the at least one of (a) value information or (b) boundary activation information via an interactive user interface provided via a display of the user computing device; and
causing, by the one or more processors, purchase of a portfolio comprising the set of assets based on the at least a portion of the at least one of (a) value information or (b) boundary activation information.

2. The method of claim 1, wherein the value corresponding to the system at the initial or one or more intermediate times is determined by the DNN and comprises at least one of (a) a numerical value or (b) an expression for the value corresponding to the system at the initial time as a function of the initial set of underlying features.

3. The method of claim 1, wherein the likelihood of boundary activation comprises at least one of (a) a numerical value, (b) an expression for the likelihood of boundary activation as a function of the initial set of underlying features, or (c) an expression for the likelihood of boundary activation as a function of time.

4. The method of claim 1, wherein the deep BSDE solver is a computational graph comprising nodes dedicated to evaluating the boundary condition at each time step based on the set of underlying features at the time step.

5. The method of claim 1, wherein once the output value for the path has been updated and the output time for the path has been updated based on a determination that the boundary condition has been activated for the first time for the path, preventing further updating of the output value and the output time for the path.

6. The method of claim 1, wherein the boundary condition comprises at least one of an upper boundary or a lower boundary for the set of underlying features or the value corresponding to the set of underlying features.

7. The method of claim 1, wherein the boundary condition evolves with time.

8. The method of claim 1, wherein the one or more parameters of the DNN are modified using a stochastic gradient descent training model.

9. The method of claim 1, wherein the DNN comprises a plurality of sub-networks, each sub-network corresponding to a date of a set of dates.

10. The method of claim 1, wherein the DNN is a feedforward DNN.

11. An apparatus for determining and providing value information and/or boundary activation information for a system defined in an at least partially bounded domain and having boundary conditions imposed at a boundary of the bounded domain, the apparatus comprising:
processor circuitry configured to:
determine a plurality of paths for the system through at least a portion of the bounded domain based on an initial set of underlying features and a path evolution determined for each path, each path corresponding to a set of times comprising an initial time, a final time, and one or more intermediate times between the initial time and the final time, wherein the set of underlying features corresponds to respective financial values of a set of assets;
cause a deep backward stochastic differential equation (deep BSDE) solver to be trained until a convergence requirement is satisfied by:
for each time step and for each path:
determine the set of underlying features and a value corresponding to the set of underlying features,
determine, based on the set of underlying features for that path, whether a boundary condition has been activated for the path, and
when it is determined that a boundary condition has been activated for a first time for the path, update an output value for the path based on the boundary condition and an output time based on the time step at which the boundary condition was activated for the path,
when the boundary condition was not activated for the path prior to the path reaching the final time, update the output value for the path based on a final value corresponding to the set of underlying features at the final time,
define a set of output values comprising the output value for each path and determining one or more statistical measures of spread based on the set of output values, and
modify one or more parameters of a DNN of the deep BSDE solver based on the one or more statistical measures of spread;
after the convergence requirement is satisfied, determine at least one of (a) value information comprising a value corresponding to the system at the initial time and/or at one or more intermediate times based on the values and features for each path or (b) boundary activation information comprising a likelihood of boundary activation;

cause at least a portion of the at least one of (a) value information or (b) boundary activation information to be provided such that a user computing device receives the at least a portion of the at least one of (a) value information or (b) boundary activation information and provides a representation of the at least a portion of the at least one of (a) value information or (b) boundary activation information via an interactive user interface provided via a display of the user computing device; and cause purchase of a portfolio comprising the set of assets based on the at least a portion of the at least one of (a) value information or (b) boundary activation information.

12. The apparatus of claim 11, wherein the value corresponding to the system at the initial or one or more intermediate times is determined by the DNN and comprises at least one of (a) a numerical value or (b) an expression for the value corresponding to the system at the initial time as a function of the initial set of underlying features.

13. The apparatus of claim 11, wherein the likelihood of boundary activation comprises at least one of (a) a numerical value, (b) an expression for the likelihood of boundary activation as a function of the initial set of underlying features, or (c) an expression for the likelihood of boundary activation as a function of time.

14. The apparatus of claim 11, wherein the deep BSDE solver is a computational graph comprising nodes dedicated to evaluating the boundary condition at each time step based on the set of underlying features at the time step.

15. The apparatus of claim 11, wherein once the output value for the path has been updated and the output time for the path has been updated based on a determination that the boundary condition has been activated for the first time for the path, preventing further updating of the output value and the output time for the path.

16. The apparatus of claim 11, wherein the boundary condition comprises at least one of an upper boundary or a lower boundary for the set of underlying features or the value corresponding to the set of underlying features.

17. The apparatus of claim 11, wherein the boundary condition evolves with time.

18. The apparatus of claim 11, wherein the one or more parameters of the DNN are modified using a stochastic gradient descent training model.

19. The apparatus of claim 11, wherein the DNN comprises a plurality of sub-networks, each sub-network corresponding to a date of a set of dates.

20. The apparatus of claim 11, wherein the DNN is a feedforward DNN.

* * * * *